United States Patent
Lin et al.

(10) Patent No.: US 11,729,653 B2
(45) Date of Patent: Aug. 15, 2023

(54) CHANNEL STATE INFORMATION (CSI) MEASUREMENT AND REPORT OUTSIDE ACTIVE DOWNLINK (DL) BANDWIDTH PART (BWP)

(71) Applicant: Samsung Electronics Co., Ltd., Suwon-si (KR)

(72) Inventors: Qiongjie Lin, Sunnyvale, CA (US); Aristides Papasakellariou, Houston, TX (US); Carmela Cozzo, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 17/302,235

(22) Filed: Apr. 27, 2021

(65) Prior Publication Data

US 2021/0345148 A1 Nov. 4, 2021

Related U.S. Application Data

(60) Provisional application No. 63/019,072, filed on May 1, 2020.

(51) Int. Cl.
*H04W 24/10* (2009.01)
*H04W 72/0453* (2023.01)
(Continued)

(52) U.S. Cl.
CPC .......... *H04W 24/10* (2013.01); *H04L 5/0053* (2013.01); *H04W 72/0453* (2013.01); *H04W 72/1268* (2013.01); *H04W 72/23* (2023.01)

(58) Field of Classification Search
CPC ............. H04W 24/10; H04W 72/0453; H04W 72/1268; H04W 72/1289; H04W 16/10;
(Continued)

(56) References Cited

U.S. PATENT DOCUMENTS

2014/0112300 A1  4/2014  Han et al.
2017/0111898 A1*  4/2017  Han .................. H04L 67/51
(Continued)

FOREIGN PATENT DOCUMENTS

EP  3609277 A1 *  2/2020  ........... H04L 5/0048

OTHER PUBLICATIONS

Samsung, "Feature lead summary for MU-MIMO CSI Monday offline session", R1-1913310, 3GPP TSG RAN WG1 99, Reno, USA, Nov. 18-22, 2019, 2 pages.
(Continued)

*Primary Examiner* — Thai Nguyen

(57) ABSTRACT

Apparatuses and methods for channel state information (CSI) measurement and report outside an active downlink (DL) bandwidth part (BWP). A method for a user equipment includes receiving configurations for a first set of DL BWPs, for reference signal (RS) resource sets in a second set of DL BWPs, and for CSI reports corresponding to the second set of DL BWPs; receiving RS resources from the RS resource sets in a third set of DL BWPs; and determining a first number of CSI reports based on the received RS resources. The method further includes determining a second number of CSI reports that have (i) values for a CSI report quantity that are larger those in other CSI reports from the first number of CSI reports and (ii) corresponding DL BWP indexes and transmitting a channel that includes the second number of CSI reports and the indexes.

20 Claims, 13 Drawing Sheets

(51) Int. Cl.
*H04L 5/00* (2006.01)
*H04W 72/1268* (2023.01)
*H04W 72/23* (2023.01)

(58) Field of Classification Search
CPC ............. H04W 72/0493; H04L 5/0053; H04L 5/0057; H04L 5/0092
See application file for complete search history.

(56) References Cited

U.S. PATENT DOCUMENTS

| | | | |
|---|---|---|---|
| 2019/0141695 A1 | 5/2019 | Babaei et al. | |
| 2019/0207662 A1* | 7/2019 | Zhou | H04L 5/0048 |
| 2019/0253181 A1 | 8/2019 | Rahman et al. | |
| 2019/0363772 A1 | 11/2019 | Davydov et al. | |
| 2022/0240187 A1* | 7/2022 | Guo | H04L 5/0053 |

OTHER PUBLICATIONS

International Search Report and Written Opinion of the International Searching Authority in connection with International Application No. PCT/KR2021/005532 dated Jul. 30, 2021, 7 pages.

"5G; NR; Physical channels and modulation (3GPP TS 38.211 version 15.5.0 Release 15)", ETSI TS 138 211 V15.5.0, Apr. 2019, 98 pages.

"5G; NR; Multiplexing and channel coding (3GPP TS 38.212 version 15.5.0 Release 15)", ETSI TS 138 212 V15.5.0, May 2019, 104 pages.

"5G; NR; Physical layer procedures for control (3GPP TS 38.213 version 15.5.0 Release 15)", ETSI TS 138 213 V15.5.0, May 2019, 106 pages.

"5G; NR; Physical layer procedures for data (3GPP TS 38.214 version 15.5.0 Release 15)", ETSI TS 138 214 V15.5.0, May 2019, 105 pages.

"3rd Generation Partnership Project; Technical Specification Group Radio Access Network; NR; Physical layer measurements, (Release 15)", 3GPP TS 38.215 V15.5.0, Jun. 2019, 16 pages.

"5G; NR; Medium Access Control (MAC) protocol specification (3GPP TS 38.321 version 15.5.0 Release 15)", ETSI TS 138 321 V15.5.0, May 2019, 80 pages.

"3rd Generation Partnership Project; Technical Specification Group Radio Access Network; NR; Radio Resource Control (RRC) protocol specification, (Release 15)", 3GPP TS 38.331 V15.5.0, Mar. 2019, 491 pages.

"5G; NR; User Equipment (UE) procedures in idle mode and in RRC Inactive state (3GPP TS 38.304 version 15.5.0 Release 15)", ETSI TS 138 304 V15.5.0, Oct. 2019, 31 pages.

"3rd Generation Partnership Project; Technical Specification Group Radio Access Network; NR; Requirements for support of radio resource management, (Release 16)", 3GPP TS 38.133 V16.0.0, Jun. 2019, 999 pages.

* cited by examiner

US 11,729,653 B2

CHANNEL STATE INFORMATION (CSI) MEASUREMENT AND REPORT OUTSIDE ACTIVE DOWNLINK (DL) BANDWIDTH PART (BWP)

CROSS-REFERENCE TO RELATED APPLICATION AND CLAIM OF PRIORITY

This application claims priority under 35 U.S.C. § 119(e) to U.S. Provisional Patent Application No. 63/019,072 filed on May 1, 2020. The above-identified provisional patent application is hereby incorporated by reference in its entirety.

TECHNICAL FIELD

The present disclosure relates generally to wireless communication systems and, more specifically, the present disclosure relates to CSI measurement and report outside an active DL BWP.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to CSI measurement and report outside an active DL BWP.

In one embodiment, a user equipment (UE) is provided. The UE includes a transceiver configured to receive a first configuration for a first set of DL BWPs where each DL BWP in the first set of DL BWPs has an index, a second configuration for reference signal (RS) resource sets in a second set of DL BWPs that is a subset of the first set of DL BWPs, a third configuration for channel state information (CSI) reports corresponding to the second set of DL BWPs, and RS resources from the RS resource sets in a third set of DL BWPs that is a subset of the second set of DL BWPs. The UE further includes a processor operably connected to the transceiver. The processor is configured to determine a first number of CSI reports based on the received RS resources and a second number of CSI reports, from the first number of CSI reports, that have (i) values for a CSI report quantity that are larger than values for the CSI report quantity in other CSI reports from the first number of CSI reports and (ii) corresponding DL BWP indexes. The transceiver is further configured to transmit a physical uplink control channel (PUCCH) or a physical uplink shared channel (PUSCH) that includes the second number of CSI reports of the values for the CSI report quantity and information indicating the corresponding DL BWP indexes.

In another embodiment, a base station (BS) is provided. The BS includes a processor and a transceiver operably connected to the processor. The transceiver is configured to transmit a first configuration for a first set of DL BWPs where each DL BWP in the first set of DL BWPs has an index; transmit a second configuration for RS resource sets in a second set of DL BWPs that is a subset of the first set of DL BWPs; transmit a third configuration for CSI reports corresponding to the second set of DL BWPs; transmit RS resources from the RS resource sets in a third set of DL BWPs that is a subset of the second set of DL BWPs; and receive a PUCCH or a PUSCH that includes a number of CSI reports and corresponding DL BWPs indexes.

In yet another embodiment, a method is provided. The method includes receiving a first configuration for a first set of DL BWPs where each DL BWP in the first set of DL BWPs has an index; receiving a second configuration for RS resource sets in a second set of DL BWPs that is a subset of the first set of DL BWPs; receiving a third configuration for CSI reports corresponding to the second set of DL BWPs; and receiving RS resources from the RS resource sets in a third set of DL BWPs that is a subset of the second set of DL BWPs. The method further includes determining a first number of CSI reports based on the received RS resources; determining a second number of CSI reports, from the first number of CSI reports, that have (i) values for a CSI report quantity that are larger than values for the CSI report quantity in other CSI reports from the first number of CSI reports and (ii) corresponding DL BWP indexes; and transmitting a PUCCH or a PUSCH that includes the second number of CSI reports of the values for the CSI report quantity and information indicating the corresponding DL BWP indexes.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
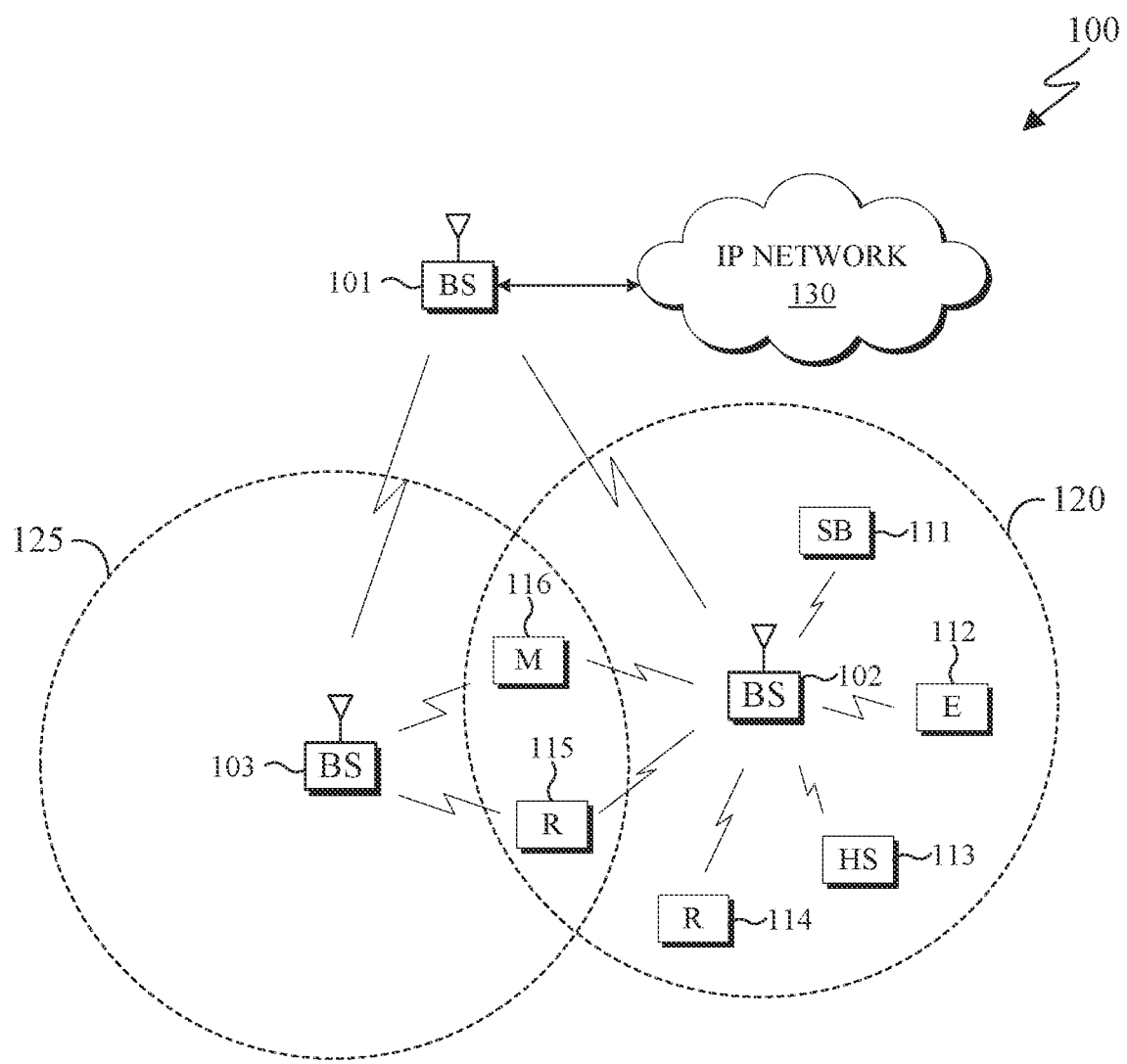
FIG. 1 illustrates an example wireless network according to embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v15.5.0, "NR; Physical channels and modulation;" 3GPP TS 38.212 v15.5.0, "NR; Multiplexing and channel coding;" 3GPP TS 38.213 v15.5.0, "NR; Physical layer procedures for control;" 3GPP TS 38.214 v15.5.0, "NR; Physical layer procedures for data;" 3GPP TS 38.215 v15.5.0, "NR; Physical layer measurements;" 3GPP TS 38.321 v15.5.0, "NR; Medium Access Control (MAC) protocol specification;" 3GPP TS 38.331 v15.5.0, "NR; Radio Resource Control (RRC) protocol specification;" 3GPP TS 38.304 v15.5.0, "NR; User Equipment (UE) procedures in Idle mode and RRC Inactive State;" and 3GPP TS 38.133 v16.0.0, "NR; Requirements for support of radio resource management."

To meet the demand for wireless data traffic having increased since deployment of the fourth generation (4G) communication systems, efforts have been made to develop and deploy an improved $5^{th}$ generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
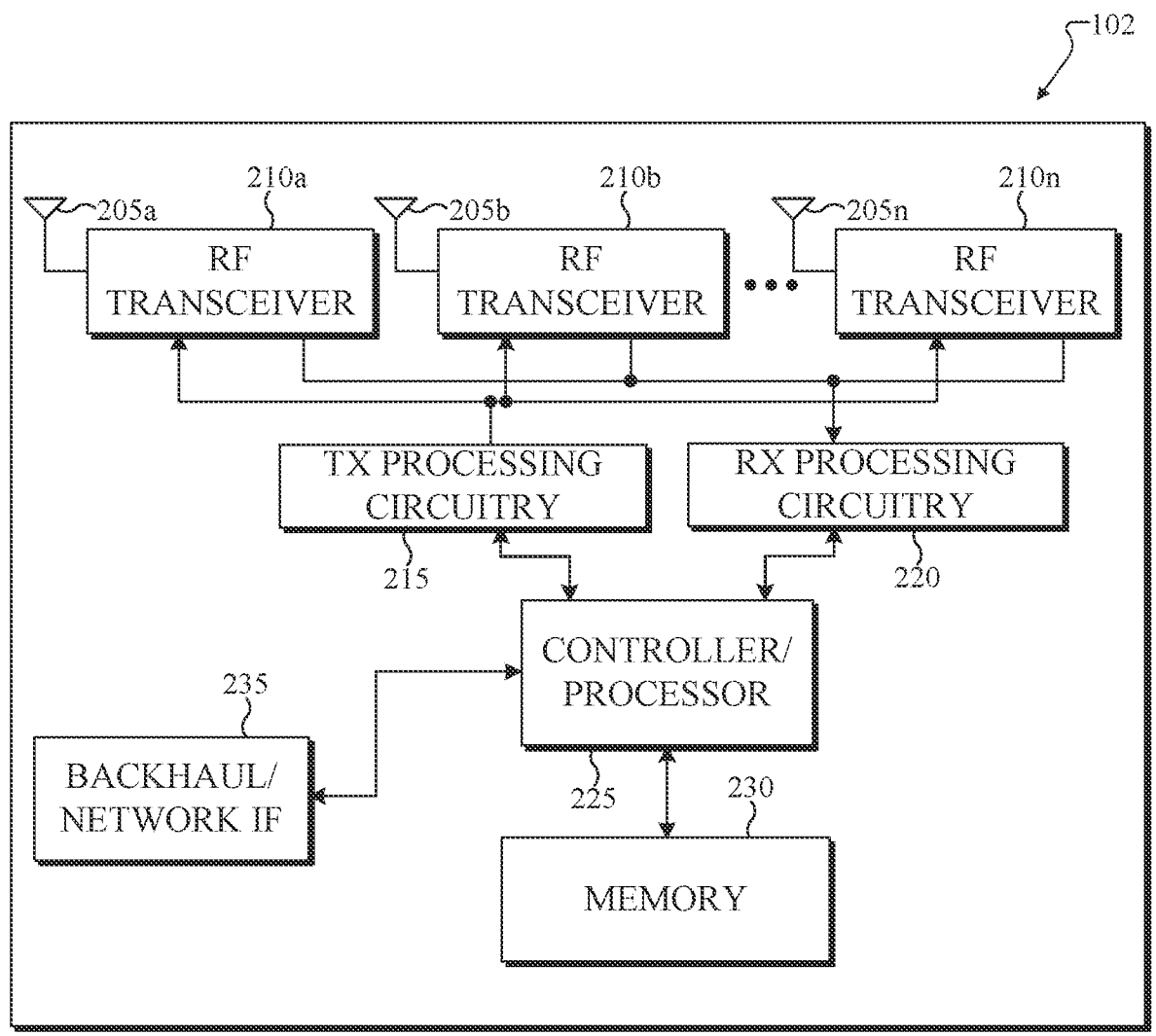
FIG. 2 illustrates an example gNB according to embodiments of the present disclosure.
Figure 3:
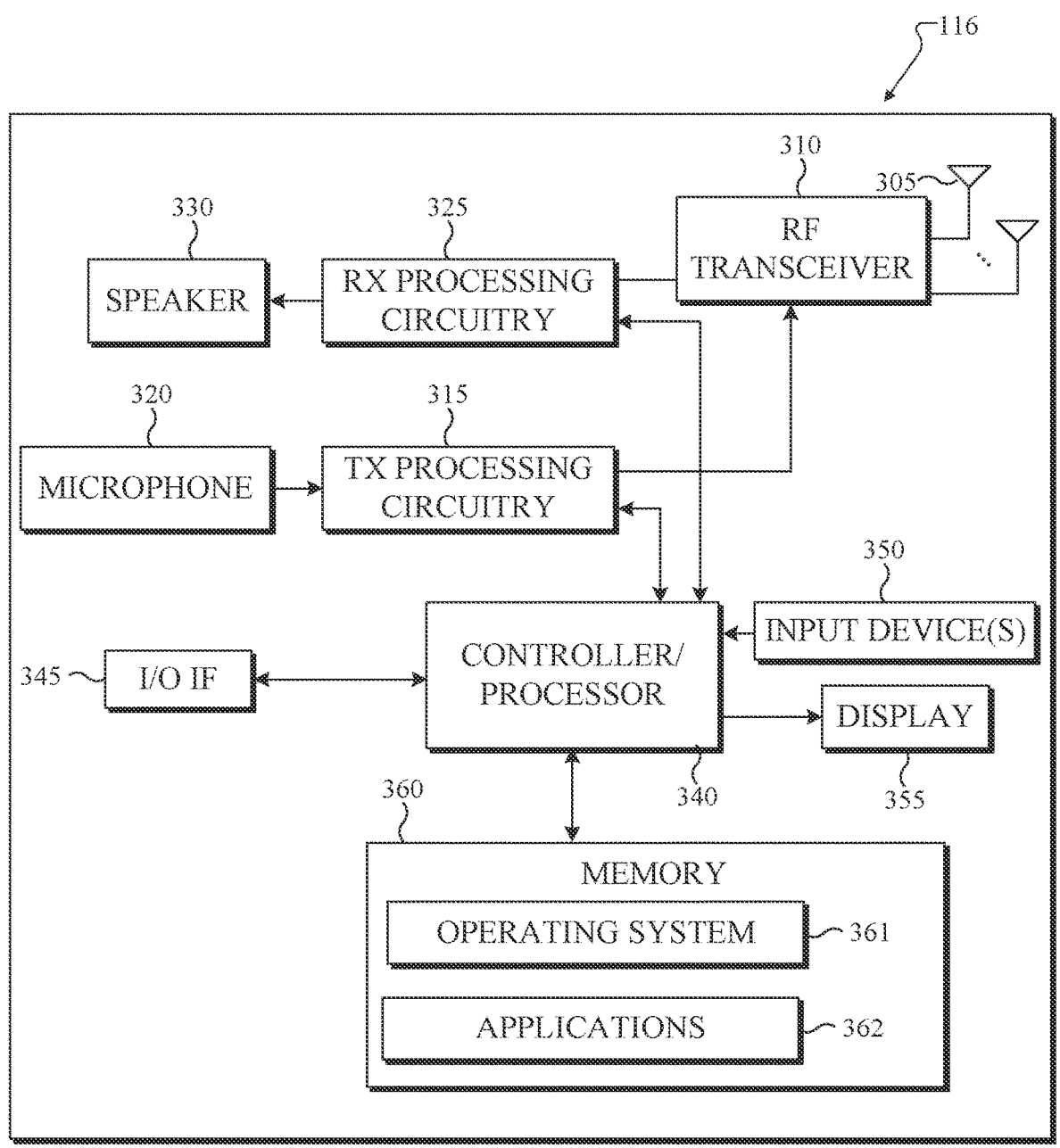
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipment's (Ues) within a coverage area 120 of the gNB 102. The first plurality of Ues includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of Ues within a coverage area 125 of the gNB 103. The second plurality of Ues includes the UE 115 and the UE 116. In some embodiments, one or more of the gNBs 101-103 may communicate with each other and with the Ues 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, LTE, LTE-A, high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine). For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the Ues 111-116 include circuitry, programming, or a combination thereof for channel state information (CSI) measurement and report outside active downlink (DL) bandwidth part (BWP). In certain embodiments, and one or more of the gNBs 101-103 includes circuitry, programming, or a combination thereof for CSI measurement and report outside active DL BWP.

Although FIG. 1 illustrates one example of a wireless network, various changes may be made to FIG. 1. For example, the wireless network could include any number of gNBs and any number of Ues in any suitable arrangement. Also, the gNB 101 could communicate directly with any number of Ues and provide those Ues with wireless broadband access to the network 130. Similarly, each gNB 102-103 could communicate directly with the network 130 and provide Ues with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNB s come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by Ues in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support assisted sensing for CSI measurements. Any of a wide variety of other functions could be supported in the gNB 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities. The controller/processor 225 can move data into or out of memory 230 according to a process that is being executed.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the Ues 111-115 of FIG. 1 could have the same or similar configuration. However, Ues come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350 and the display 355. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, Ues could be configured to operate as other types of mobile or stationary devices.

Embodiments of the present disclosure take into consideration that NR Release 16 (Rel-16) supports channel state information (CSI) measurement and report for active downlink (DL) bandwidth parts (BWP). However, when a UE is triggered with a CSI report for a DL BWP that is non-active, the UE is not expected to report the CSI for the non-active DL BWP and the CSI report associated with that BWP is omitted. Similarly, when a UE is triggered with aperiodic non-zero-power (NZP) channel state information reference signal (CSI-RS) in a DL BWP that is non-active when expecting to receive the NZP CSI-RS, the UE is not expected to measure the aperiodic CSI-RS. For example, in order to get CSI over an entire carrier bandwidth, a UE can be switched to a BWP with a large bandwidth and triggered with an aperiodic CSI report for the BWP. However, this approach fails to work for a device with limited operation bandwidth. Therefore, embodiments of the present disclosure take into consideration that it is necessary to support CSI measurement and report for non-active DL BWP for at least UE with limited operation bandwidth.

For a UE with reduced operation bandwidth, if the CSI for all configured DL BWPs, including both active and non-active BWPs are available on the network (NW) side, the NW can then switch the UE to the best BWP or narrowband for data reception. This can improve channel efficiency. Acquisition of CSI outside active BWP is also beneficial for congestion control when a cell serves a large number of Ues with limited UE operation bandwidth. If CSI across the entire carrier bandwidth is available on the NW side, the NW can distribute Ues into the active DL BWP according to the real-time channel condition on the UE side.

Embodiments of the present disclosure also takes into consideration that NR Release 15 (Rel-15) supports radio resource management (RRM) measurement for mobility in RRC_CONNECTED state during measurement gap outside active DL BWP. The measurement gap for RRM measurement is configured either per frequency range or per UE. Embodiments of the present disclosure further takes into consideration that Rel-16 also supports measurement gap for intra-frequency positioning reference signal (PRS) measurement outside active BWP. However, the measurement gap is supported to receive DL RS with configuration independent from BWP configuration. The preconfigured measurement gap from a higher layer can be inefficient if the timing of measurement gap and DL RS from multiple DL BWPs are not aligned.

Since NR supports 1-to-1 mapping between a CSI report and resourcesForChannelMeasurement (per BWP), multiple CSI reports are needed to finish reporting all CSI from multiple BWPs. Embodiments of the present disclosure consider a CSI report for multiple DL BWPs for reducing signaling overhead and increasing power saving.

Accordingly, embodiments of the present disclosure support periodic measurement gap per serving cell for CSI measurement outside active DL BWPs, and corresponding CSI report. Embodiments of the present disclosure also support an aperiodic CSI report for one or more DL BWPs with DL RS for channel measurement received by UE within a predetermined aperiodic measurement gap. Embodiments of the present disclosure further support CSI measurement in a dormant DL BWP triggered by a physical layer signal/channel based on BWP switching to avoid additional RF retuning. Additionally, embodiments of the present disclosure support aperiodic CSI measurement or reporting for multiple DL BWPs triggered by a DCI format monitored in common search space set.

Embodiments of the present disclosure takes into consideration of how to support CSI measurement and report for non-active DL BWPs based on a higher layer measurement gap. Embodiments of the present disclosure also takes into consideration of how to support CSI measurement and report for non-active DL BWPs based on aperiodic measurement gap triggered by physical layer signal/channel Embodiments of the present disclosure further takes into consideration of how to support CSI measurement and report for a dormant DL BWP triggered by physical layer signal/channel. Additionally, embodiments of the present disclosure takes into consideration of how to support cell-specific aperiodic CSI-RS resources and CSI report for one or more DL BWPs triggered by a new DCI format monitored in a common search space set.

Embodiments of the present disclosure relate to determining periodic measurement gap for CSI measurement and report outside active DL BWP and corresponding CSI reports. The disclosure also relates to determining aperiodic CSI report for one or more DL BWPs with DL RS for channel measurement received by UE within a predetermined aperiodic measurement gap. This disclosure further relates to determining CSI measurement in a dormant DL BWP triggered by a physical layer signal/channel. This disclosure additionally relates to determining cell-specific aperiodic CSI-RS resources and CSI report for one or more DL BWPs triggered by a new DCI format monitored in a common search space set.

Periodic CSI Measurement Gap Per Serving Cell

Embodiments of the present disclosure considers a periodic measurement gap is for channel measurement on one or more DL BWPs on a serving cell. In certain embodiments, the one or more DL BWPs are all non-active. In other embodiments, one or more DL BWPs can be either active or non-active. For a configured serving cell, a UE (such as the UE 116 of FIGS. 1 and 3) can be provided with a measurement gap for receiving DL reference signals (RS) for channel measurement for one or more DL BWPs on the serving cell. The measurement gap is denoted as MG_CM in this disclosure. The configuration of MG_CM can be provided to the UE through higher layer signaling.

Figure 4:
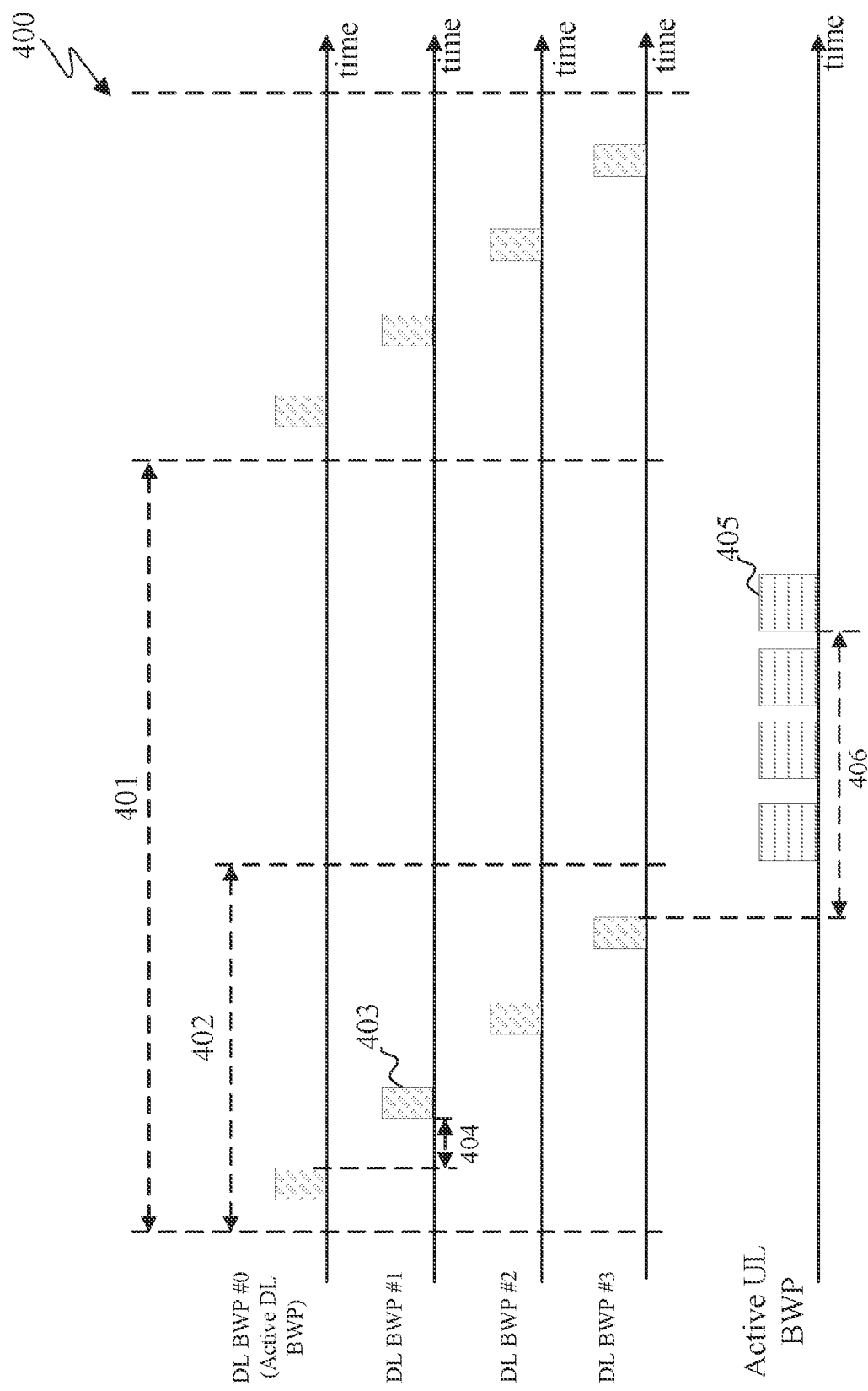
FIG. 4 illustrates an example measurement gap configuration according to embodiments of the present disclosure.

FIG. 4 illustrates an example timeline 400 for aperiodic CSI report for four DL BWPs according to embodiments of the present disclosure. The example timeline 400 of FIG. 4 is for illustration only and other embodiments can be used without departing from the scope of the present disclosure.

The example timeline 400 of FIG. 4 illustrates an example of measurement gap configuration for receiving DL RS for channel measurement across all configured DL BWPs, including both active DL BWP and non-active DL BWPs. In certain embodiments, a MG_CM configuration includes a measurement gap length, 402, denoted as mgl. The measurement gap length, 402, indicates the duration or length of a measurement gap in the unit of one millisecond or one slot.

In certain embodiments, a MG_CM configuration includes a measurement gap repetition period, 401, denoted as mgrp. The measurement gap repetition period 401 indicates the periodicity in the unit of one millisecond or one slot at which the measurement gap repeats.

In certain embodiments, a MG_CM configuration includes a measurement gap offset, denoted as gapOffset. The measurement gap offset can be in one millisecond or one slot. The measurement gap offset is a gap offset of the gap pattern within a measurement gap repetition period determined by mrgp. The value range of gapOffset is from 0 to mgrp−1.

In certain embodiments, a MG_CM configuration is activated or deactivated based on signaling from higher layers. For example, for a UE that includes a configuration of MG_CM, the UE can determine the single frequency network (SFN) of a MG_CM i.e. SFN_MG, and the subframe of a MG_CM, i.e. sf_MG, which is described in Equation (1), below $$sfn_{MG} \bmod \left(\frac{mgrp}{10}\right) = \left\lfloor \frac{gapOffset}{10} \right\rfloor, sf_{MG} = gapOffset \bmod 10 \quad (1)$$

To allow for channel measurement and CSI computation to occur based on a measurement gap, a UE can be provided with timeline requirement of X1, 404 or X2, 406. The UE expects the timeline meet the requirement restricted by any of X1 or X2. t is noted that X1 is the minimum time offset between the last symbol of the DL RS from BWP_i, and the first symbol of the DL RS from BWP_j, where UE performs CSI measurement based on DL RS in BWP_j after completing CSI measurement based on DL RS in BWP_i. X2 is the minimum time offset between the last symbol of a DL BWP in which the UE is indicated to perform CSI measurement and the first symbol of a PUCCH/PUSCH, 405 which carriers a CSI report for the DL BWPs.

For determining applicable resources for channel measurement within a MG_CM of a serving cell, the resource 403 can either be NZP CSI-RS or synchronizations signal physical broadcast channel (SS/PBCH) blocks transmitted from the serving cell. For example, the applicable resources for channel measurement within a MG_CM, can be CSI-RS or SS/PBCH block configured by higher layer parameter CSI-ResourceConfig. If a UE is configured with higher layer parameter CSI-ResourceConfig, the UE can perform channel measurements based on CSI-ResourceConfig during a MG_CM. The resources can be received by the UE in a configured DL BWP based on higher layer parameter bwp-Id. The resources can be periodic or semi-persistent or aperiodic based on higher layer parameter resourceType.

For another example, the applicable resources for channel measurement within a MG_CM, can be NZP CSI-RS and configured by higher layer parameter NZP-CSI-RS-ResourceSet without higher layer parameter trs-Info or with higher layer parameter trs-Info set to "false". If a UE is configured with higher layer parameter NZP-CSI-RS-ResourceSet, the UE can perform channel measurements based on NZP-CSI-RS-ResourceSet during a MG_CM. The resources can be received by the UE in a configured DL BWP associated with NZP-CSI-RS-ResourceSet.

For determining the CSI reporting with channel measurement within a MG_CM, a UE can report CSI (e.g., in a uplink channel 405 such as PUCCH or PUSCH) for a DL BWP no matter the DL BWP is active or not if the CSI is measured based on resources received in the DL BWP within a MG_CM. In a first approach to guarantee sufficient CSI computation time, the UE measure the resources and transmit the CSI report if there is a valid measurement occasion for receiving the resources. Alternatively, if there is not a valid measurement occasion for receiving the resources, the UE skips receiving the resources and ignores the CSI report. The UE can determine that there is a valid measurement occasion within a MG_CM for a CSI report for a DL BWP if the time gap between the most recent measurement occasion for receiving resources associated with the CSI report within the MG_CM and previous valid measurement occasion associated with another CSI report for a different DL BWP is larger than T0. In one example, T0 can be the BWP switching delay reported by the UE. In another example, T0 can be reported by UE as UE capability.

In a second approach to guarantee sufficient CSI computation time, a UE can be provided with timeline requirement of Z0. The timeline requirement of Z0 is the minimum time offset between the last symbol of the DL RS from BWP_i, and the first symbol of the DL RS from BWP_j, where UE performs CSI measurement based on DL RS in BWP_j after completing CSI measurement based on DL RS in BWP_i. To determine Z0, a UE can report its capability of Z0 to the network. The unit of Z0 can be one slot, one OFDM symbol, or one millisecond. The UE can anticipate the timeline for CSI measurement within the MG_CM meet the timeline requirement defined by Z0.

The following three examples describe CSI reporting with channel measurement within a MG_CM. For example, if a UE is provided with a configuration of MG_CM and higher layer parameter CSI-ReportConfig with reportConfigType set to 'periodic,' 'semiPersistentOnPUCCH', or 'semi-PersistentOnPUSCH', the UE then reports a CSI in a Physical Uplink Control Channel (PUCCH) or physical uplink shared channel (PUSCH) based on CSI-ReportConfig for a configured BWP when the resources for channel measurement based on higher layer parameter resourcesForChannelMeasurement are received by the UE within a MG_CM. The configured DL BWP can be non-active DL BWP.

For another example, if a UE is provided with a configuration of MG_CM, when a UE is triggered with a CSI report for a DL BWP that is non-active when expecting to receive the most recent occasion during a MG_CM, no later than the CSI reference resource, of the associated NZP CSI-RS, the UE is expected to report the CSI for the non-active DL BWP. When a UE is triggered with aperiodic NZP CSI-RS in a DL BWP that is non-active when expecting to receive the NZP CSI-RS within a MG_CM, the UE is expected to measure the aperiodic CSI-RS.

For yet another example, the CSI reporting is L1-RSRP (reference signal received power) reporting for a configured DL BWP regardless of whether the BWP is active or not active. If a UE is provided with a configuration of MG_CM and higher layer parameter CSI-ReportConfig with reportQuantity set to "cri-RSRP," "cri-SINR," or "none" the UE then reports a CSI in a PUCCH or PUSCH based on CSI-ReportConfig for a configured BWP when the resources for channel measurement based on higher layer parameter resourcesForChannelMeasurement are received by the UE within a MG_CM.

Figure 5:
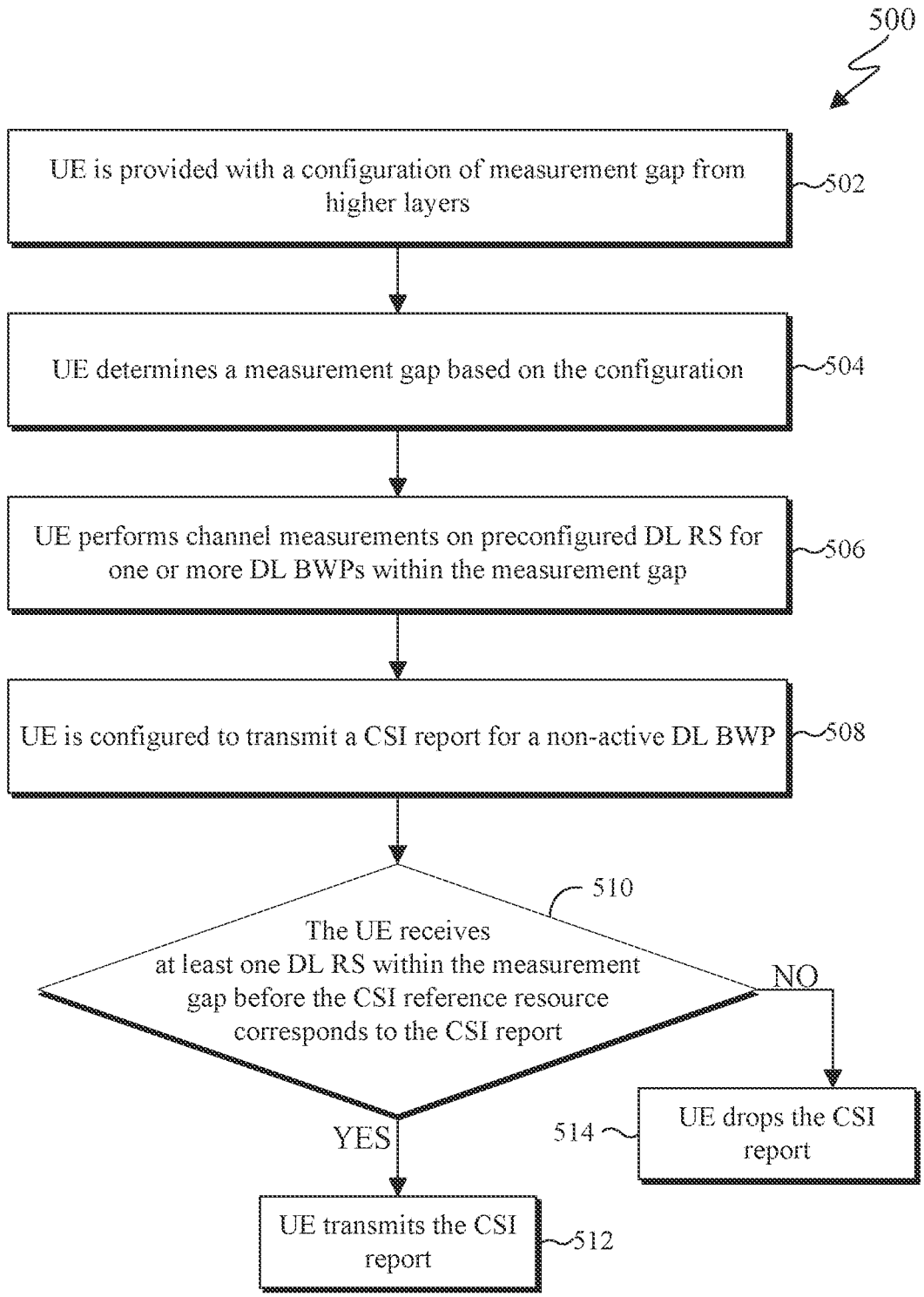
FIG. 5 illustrates an example method of a UE procedure for CSI measurement and reports according to embodiments of the present disclosure.

FIG. 5 illustrates an example method 500 of a UE procedure for channel state information (CSI) measurement and reports according to embodiments of the present disclosure. For example, the steps of the method 500 can be performed by the any of the UEs 111-116 of FIG. 1, such as the UE 116 of FIG. 3. The method 500 of FIG. 5 is for illustration only and other embodiments can be used without departing from the scope of the present disclosure.

As illustrated in FIG. 5, the method 500 describes an example of UE procedure for CSI measurement and report for non-active DL BWPs based on a preconfigured measurement gap. In step 502, a UE is provided with a configuration of measurement gap from higher layers. In step 504, the UE determines a measurement gap based on the configuration. In step 506, the UE performs channel measurements on preconfigured DL RS for one or more DL BWPs within the measurement gap. In step 508, the UE transmits a CSI report for a non-active DL BWP.

In step 510, the UE determines whether it received at least one DL RS within the measurement gap before the CSI reference resource corresponds to the CSI report. In step 512, when the UE receives at least one DL RS within the measurement gap before the CSI reference resource corresponds to the CSI report, the UE transmits the CSI report. Alternatively, in step 514, if at least one DL RS is no received within the measurement gap before the CSI reference resource corresponds to the CSI report, the UE drops the CSI report.

For determining UE procedure for physical downlink control channel (PDCCH) reception in an active DL BWP within a MG_CM, the UE does not expect to monitor or receive PDCCH within a MG_CM in the active DL BWP. Similarly, for determining UE procedure for physical downlink shared channel (PDSCH) reception in an active DL BWP within a MG_CM, the UE doesn't expect to receive PDSCH within a MG_CM in the active DL BWP.

In certain embodiments, when a UE is provided with both a configuration of MG_CM and another type of measurement gap (such as a measurement gap for RRM measurement or PRS reception), then to avoid a collision, the UE can assume that there is no overlapping between MG_CM and other type of measurement gap. Similarly, if a UE is provided with both a configuration of MG_CM and another type of measurement gap (such as a measurement gap for RRM measurement or PRS reception), then to avoid a collision, the UE can skip the MG_CM when the MG_CM overlaps with other type of measurement gap.

In some embodiments, the UE receives a MAC CE to indicate activation or deactivation of a MG_CM for CSI-RS resources reception and CSI report quantity determination. In one example, the MAC CE indicates activation of one or more MG_CM with configurations provided by higher layers. In another example, the MAC CE indicates deactivation of one or more MG_CM. The UE applies the activation or deactivation command after transmitting HARQ-ACK in response of reception of the MAC CE.

Although FIG. 5 illustrates the method 500, various changes may be made to FIG. 5. For example, while method 500 of FIG. 5 is shown as a series of steps, various steps could overlap, occur in parallel, occur in a different order, or occur multiple times. In another example, steps may be omitted or replaced by other steps. For example, steps of the method 500 can be executed in a different order.

Aperiodic Measurement Gap or Aperiodic CSI Report

Embodiments of this disclosure also consider and describe an aperiodic CSI report for one or more DL BWPs with resources for channel measurement received by UE within a predetermined aperiodic measurement gap. This measurement gap is referred as MG2_CM. In one example, the one or more DL BWPs are all non-active. In another example, one or more DL BWPs can be either active or non-active.

For aperiodic CSI report, a UE can be triggered to transmit a CSI report in a PUSCH based on an indication received from a physical layer signal/channel, such as a field in a DCI format. The indication indicates one of preconfigured triggering states. The UE can be provided with one or more triggering states by higher layers. A triggering state can include a list of CSI report configurations. Each CSI report configuration is mapped to a CSI resource configuration of resources for channel measurement, denoted as resourcesForChannelMeasurement. Each resourcesForChannelMeasurement can be associated with a configured DL BWP. A UE can anticipate that the DL BWPs associated with different resourcesForChannelMeasurement are configured for different DL BWPs from a same serving cell. Additionally or alternatively, a triggering state can include MG2_CM, wherein the MG2_CM indicate a time duration for receiving resources for channel measurement from N>=1 DL BWPs.

In certain embodiments, when a UE receives a physical layer signal/channel indicating a triggering state, the UE also receives DL RS s for channel measurements within a MG2_CM indicated by the triggering state. The UE does not expect to measure two consecutive measurement occasions within the MG2_CM for receiving resources for channel measurement from two DL BWPs, wherein the time offset between the two measurement occasion is larger than a predetermined time gap, T1. In one example, T1 can be the BWP switching delay reported by the UE. In another example, T1 is reported by UE as UE capability. The UE doesn't expect to monitor PDCCH nor receive any DL channel/signal other than the indicated DL RS within a MG2_CM.

To guarantee sufficient CSI computation time, a UE can be provided with timeline requirement of Y1, Y2, or Y3. The UE can anticipate that the timeline for an aperiodic CSI report for multiple DL BWPs will meet the timeline requirement defined by any of Y1, Y2, or Y3. It is noted that, Y1 is the minimum time offset between the last symbol of the PDCCH triggering the aperiodic CSI report and the first symbol of the DL RS in the first DL BWP in which the UE is indicated to perform CSI measurement. It is also noted that, Y2 is the minimum time offset between the last symbol of the DL RS from BWP_i, and the first symbol of the DL RS from BWP_j, where UE performs CSI measurement based on DL RS in BWP_j after completing CSI measurement based on DL RS in BWP_i. Y3 is the minimum time offset between the last symbol of the last DL BWP in which the UE is indicated to perform CSI measurement and the first symbol of a PUCCH/PUSCH which carriers a CSI report fro the multiple DL BWPs. In order to determine, Y1 or Y2, the UE can report its capability of any of Y1 or Y2 to the network. In certain embodiments, the unit of Y1 or Y2 can be a slot, one OFDM symbol, or one millisecond.

Figure 6:
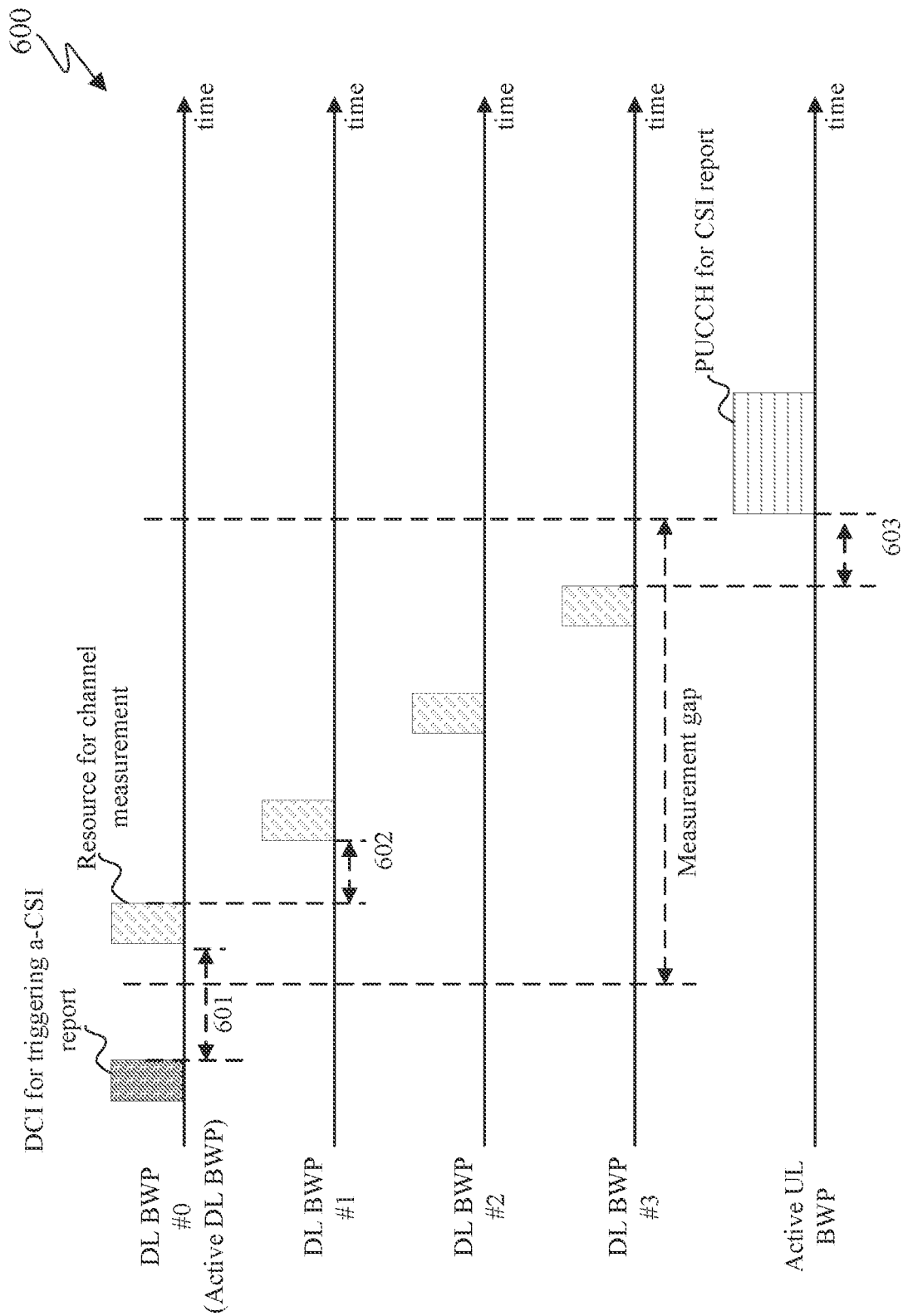
FIG. 6 illustrates an example timeline for aperiodic CSI report for four DL BWPs according to embodiments of the present disclosure.

FIG. 6 illustrates an example timeline 600 for aperiodic CSI report for four DL BWPs according to embodiments of the present disclosure. The example timeline 600 of FIG. 6 is for illustration only and other embodiments can be used without departing from the scope of the present disclosure.

The example timeline 600 of FIG. 6 illustrates an example of the timeline for aperiodic CSI report for four DL BWPs based on a MG2_CM. A UE can anticipate that 601 is no smaller than Y1, 602 is no smaller than Y2, and 603 is no smaller than Y3. In certain embodiments, after all of the DL RS s resources are received, the UE generates the CSI and transmit the CSI report based on the list of CSI report configurations indicated by the triggering state.

In certain embodiments, an aperiodic CSI for one or more DL BWPs can include a report quantity for each DL BWP based on the list of CSI report configurations or a report quantity for one DL BWP where the DL BWP has the best channel quality among all applicable DL BWPs.

In order to determine the content of an aperiodic CSI report for multiple DL BWPs, the CSI report can include CSI for each of the multiple DL BWPs. Here, the CSI is determined based on the list of CSI report configurations. Alternatively, in order to determine the content of an aperiodic CSI report for multiple DL BWPs, the CSI report can include CSI for the DL BWP, which has the best channel quality among the multiple DL BWPs. For example, if the report quantity for each CSI report configuration is L1 RSRP, then the CSI report by the UE can be the highest L1

RSRP and the index of associated CSI report configuration to indicate the associated DL BWP. The report quantity can also be channel quality indicator (CQI), or a signal-to-noise and interference ratio (SINR).

Figure 7:
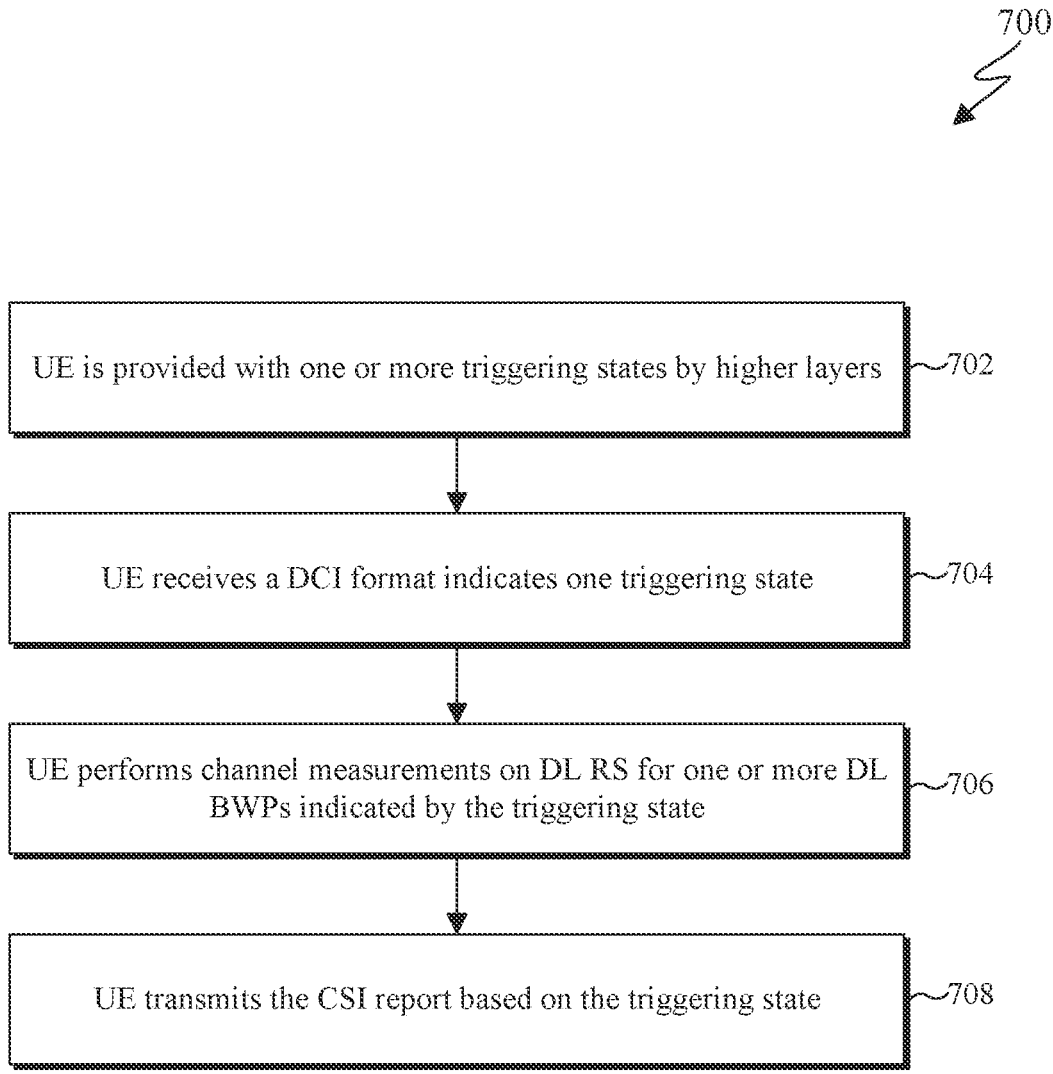
FIG. 7 illustrates an example method of a UE procedure for aperiodic CSI report for one or more DL BWPs according to embodiments of the present disclosure.

FIG. 7 illustrates an example method 700 of a UE procedure for aperiodic CSI report for one or more DL BWPs according to embodiments of the present disclosure. For example, the steps of the method 700 can be performed by the any of the UEs 111-116 of FIG. 1, such as the UE 116 of FIG. 3. The method 700 of FIG. 7 is for illustration only and other embodiments can be used without departing from the scope of the present disclosure.

In step 701, a UE is provided with one or more triggering states by higher layers. In step 702, the UE receives a DCI format indicating one triggering state. In step 703, the UE performs channel measurements on DL RS for one or more DL BWPs indicated by the triggering state. In step 704, the UE transmits the CSI report based on the triggering state.

It is also possible that the UE receives a MAC CE to indicate a triggering state for CSI-RS resources reception/measurement for one or more DL BWPs and one or more CSI reports based on the CSI-RS resources reception.

Although FIG. 7 illustrates the method 700, various changes may be made to FIG. 7. For example, while method 700 of FIG. 7 is shown as a series of steps, various steps could overlap, occur in parallel, occur in a different order, or occur multiple times. In another example, steps may be omitted or replaced by other steps. For example, steps of the method 700 can be executed in a different order.

CSI Measurement in a Dormant DL BWP

As discussed above, embodiments of this disclosure consider and describe CSI measurement in a dormant DL BWP triggered by a physical layer signal/channel. When a UE receives an indication for CSI measurement in a dormant DL BWP, the UE receives periodic or semi-persistent reference resources for CSI measurement based on higher layer parameters. For example, the UE does not monitor PDCCH nor receive PDSCH in the dormant DL BWP with respect to CSI-ResourceConfig in the dormant DL BWP, within a given time period. The given time period referred as CSI measurement gap.

For determining CSI measurement gap for a dormant DL BWP from a serving cell, a UE can be provided with a list of $N_{MG} \geq 1$ CSI measurement gaps for each configured DL BWP on the serving cell, Each CSI measurement gap can be a unit of one millisecond or one slot. The list of CSI measurement gaps can be provided to UE through higher layer signaling. The UE is configured to receive a physical layer signal/channel, where the physical layer signal/channel carries a CSI measurement gap indication with size of $N_{bits}=\lceil \log_2 N_{MG} \rceil$ bits, and a value of v (v=0, ..., $2^{N_{bits}}-1$) can indicate the (v+1)th CSI measurement gap of the list of measurement gaps for a dormant DL BWP.

In one example, the physical layer signal/channel can be DCI format, for example 1_1, with CRC scrambled by C-RNTI. If all bits of frequency domain resource assignment are set to 0 for resource allocation type 0 or set to 1 for resource allocation type 1, any of the following fields of DCI format 1_1 can be re-purposed as the CSI measurement gap indication. For example, the fields could be (i) a time domain resource assignment, (ii) a carrier indicator, (iii) a modulation and coding scheme of transport block 1, (iv) a new data indicator of transport block 1, (v) a redundancy version of transport block 1, (vi) a hybrid automatic repeat request (HARQ) process number, (vii) an antenna port(s), or (viii) any combination thereof.

In another example, the physical layer signal/channel can be a DCI format monitored by the UE in a common search space (CSS) set. In the configuration of the DCI format provided by higher layer, the UE can be provided with the starting position of the CSI measurement gap indication, or the payload size of the DCI format.

When no CSI measurement gaps are configured for a configured DL BWP, a default CSI measurement gap can be used for the DL BWP. For example, the default CSI measurement gap can be bwp-InactivityTimer for the default DL BWP. For another example, the default CSI measurement gap is defined in the specification of the system operation and can be any of 2 ms, 3 ms, 4 ms, 5 ms, 6 ms, 8 ms, 10 ms, 20 ms, 30 ms, 40 ms, 50 ms, 60 ms, 80 ms, 100 ms, 200 ms, 300 ms, 500 ms, 750 ms, or the like.

In certain embodiments, for determining a dormant DL BWP, the ID of the dormant DL BWP can be indicated by the physical layer signal/channel. For example, the physical layer signal/channel can be DCI format 1_1 with CRC scrambled by C-RNTI, and the dormant BWP is indicated by the bandwidth part indicator of DCI format 1_1 when all bits of frequency domain resource assignment are set to 0 for resource allocation type 0 or set to 1 for resource allocation type 1.

For another example, the physical layer signal/channel can be a DCI format monitored by the UE in a common search space (CSS) set. The DCI format includes one or more blocks, and the UE is configured to retrieve information from one block. The UE can be provided with starting position of the one block, and payload size of the DCI format through UE-specific RRC signaling. The one block can include a bandwidth part indicator, which indicates the dormant DL BWP. Additionally or alternatively, the one block can include a CSI measurement gap indication, if the UE is configured with a list of CSI measurement gaps for the dormant DL BWP, which indicates a CSI measurement gap from the list of CSI measurement gaps in the dormant DL BWP.

Figure 8:
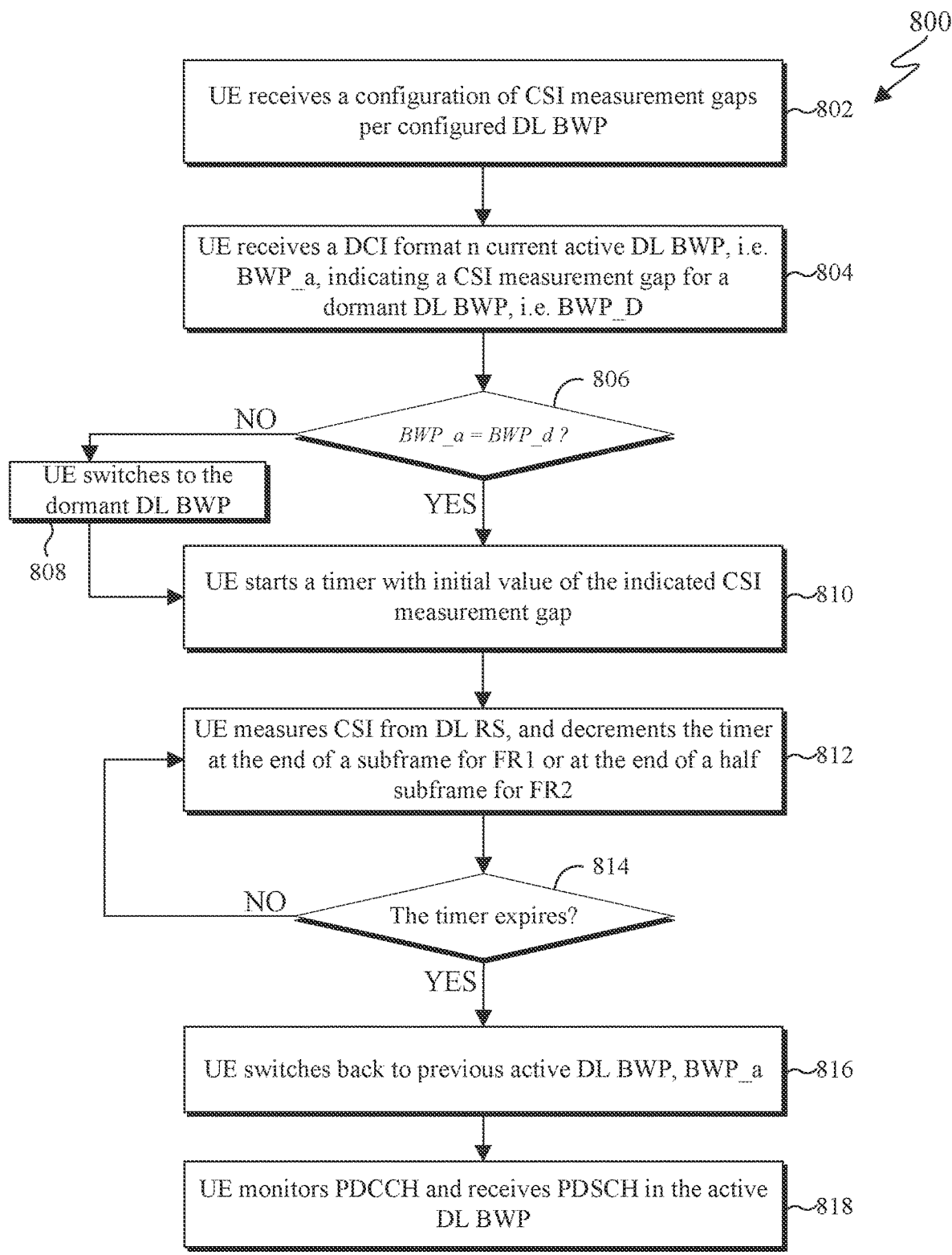
FIG. 8 illustrates an example method of a UE procedure for CSI measurement according to embodiments of the present disclosure.

FIG. 8 illustrates an example method 800 of a UE procedure for CSI measurement according to embodiments of the present disclosure. For example, the steps of the method 700 can be performed by the any of the UEs 111-116 of FIG. 1, such as the UE 116 of FIG. 3. The method 800 of FIG. 8 is for illustration only and other embodiments can be used without departing from the scope of the present disclosure.

As illustrated in FIG. 8, the method 800 illustrates an example of UE procedure for CSI measurement in a dormant DL BWP triggered by a DCI format. In step 802, a UE is configured with a list of CSI measurement gaps for each DL BWP on a serving cell. In step 804, the UE receives a PDCCH in the active DL BWP, denoted as BWP_a, and the PDCCH includes a DCI format indicates a CSI measurement gap for a dormant DL BWP, denoted as BWP_d.

In step 806, the UE determines whether the dormant DL BWP is the current active DL BWP. When the UE determines that the dormant DL BWP is not the current active DL BWP, the UE in step 808, switches to the dormant DL BWP. In step 810, if the UE is indicated to switch BWP (step 808), the UE starts a timer with initial time value of the indicated CSI measurement gap upon BWP switch is executed; otherwise the UE starts a timer with initial time value of the indicated CSI measurement gap in next slot after the slot when UE receives the DCI format.

In step 812, if the timer is not expired, the UE measures CSI based on received DL RS in the dormant DL BWP. The UE in step 812 also decrements the timer at the end of a subframe for FR1 or at the end of a half subframe for FR2. In step 814, the UE determines whether or not the timer expires. If the UE determines that the timer is expired, the UE in step 816, switches back to the previous active DL BWP, BWP_a. In step 818, the UE monitors PDCCH and receives PDSCH in the active DL BWP, 818.

In certain embodiments, a UE assumes a DL BWP is a dormant DL BWP if the timer associated with CSI measurement gap is running and not expired. The UE does not receive PDSCH nor monitor PDCCH in the dormant DL BWP. The UE can receive DL RS, such as CSI-RS or SS/PBCH blocks, if configured, and measure CSI based on the received RS in the dormant DL BWP.

Although FIG. 8 illustrates the method 800, various changes may be made to FIG. 8. For example, while method 800 of FIG. 8 is shown as a series of steps, various steps could overlap, occur in parallel, occur in a different order, or occur multiple times. In another example, steps may be omitted or replaced by other steps. For example, steps of the method 700 can be executed in a different order.

Figure 9:
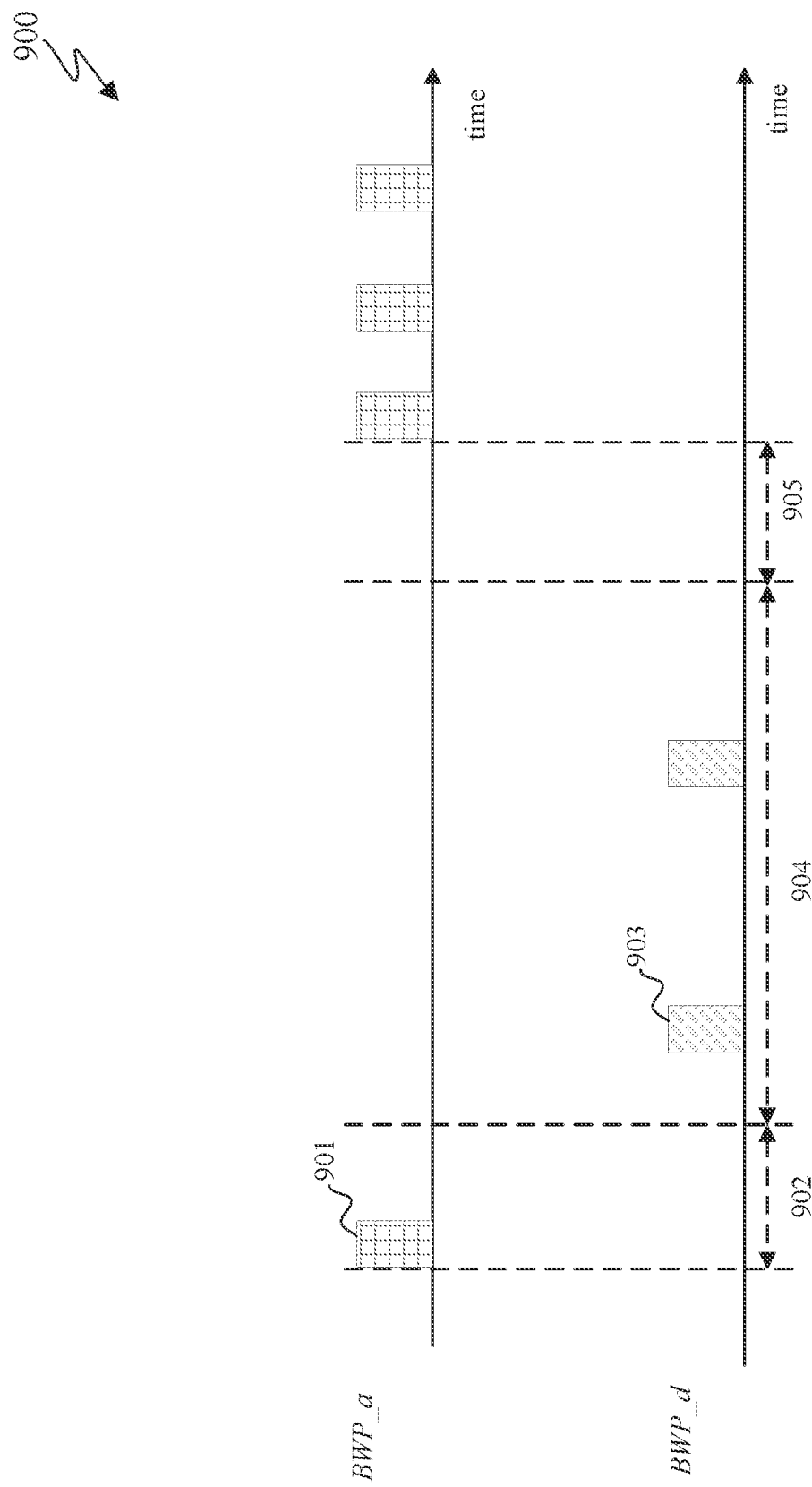
FIG. 9 illustrates an example timeline for CSI measurement according to embodiments of the present disclosure.

FIG. 9 illustrates an example timeline 900 for CSI measurement according to embodiments of the present disclosure. The example timeline 900 of FIG. 9 is for illustration only and other embodiments can be used without departing from the scope of the present disclosure.

The example timeline 900 illustrates CSI measurement in a dormant DL BWP triggered by a DCI format. As illustrated in FIG. 9, the UE monitors PDCCH in an active DL BWP, BWP_a. The UE receives a PDCCH includes a DCI format, 901, wherein the DCI format indicates a CSI measurement gap for a dormant DL BWP, BWP_d. After receiving the PDCCH includes a DCI format, 901, the UE switches to the dormant DL BWP, BWP_d, within a BWP switching delay, during time 902. The UE receives DL RS, 903, in the dormant DL BWP, and performs CSI measurement based on the received DL RS during the indicated CSI measurement gap during time 904. Upon expiry of the timer associated with the measurement gap, the UE switches back to the previous active DL BWP within a BWP switching delay, during time 905.

In certain embodiments, a UE, such as the UE 116 of FIG. 1, can be provided with a predetermined BWP switching delay, X, that can be in a unit of one slot or one millisecond. When the UE receives a physical layer signal/channel that indicates to switch from an active DL BWP to a dormant DL BWP for CSI measurement, the UE completes the switch within the BWP switching delay, X. The starting time of the BWP switch delay is the slot where the UE receives the physical layer signal/channel. The UE is not required to receive DL signals on the cell where BWP is switched.

In certain embodiments, a UE, such as the UE 116 of FIG. 1, can be provided with a predetermined BWP switching delay, Y, in unit of one slot or one millisecond. When the UE is triggered to switch from a dormant DL BWP to an active DL BWP upon the expiry of the timer associated with CSI measurement gap, the UE completes the switch within the BWP switching delay, Y. The starting time of the BWP switch delay is the slot at the beginning of a subframe (FR1) or half-subframe (FR2) immediately after timer expires. The UE is not required to receive DL signals on the cell where BWP is switched.

A first approach for determining X or Y, X or Y can be type 1 or type 2 BWP switching delay. Another approach for determining X or Y, X or Y can be a different type of BWP switching delay. For example, the values for X or Y can be 1 for sub-carrier spacing (SCS) of 15 KHz, 1 for SCS of 30 KHz, 1 for SCS of 60 KHz, and 2 for SCS of 120 KHz, respectively. If the BWP switch involves changing of SCS, the BWP switch delay is determined by the larger one between the SCS before BWP switch and the SCS after BWP switch.

In certain embodiments, if a UE, such as the UE 116 of FIG. 1, is indicated to perform CSI measurement during a measurement time gap in a dormant DL BWP, the UE can transmit a CSI report. It is noted that, the DL RS for CSI measurement corresponds to the CSI report received by the UE during the indicated measurement time gap.

Figure 10:
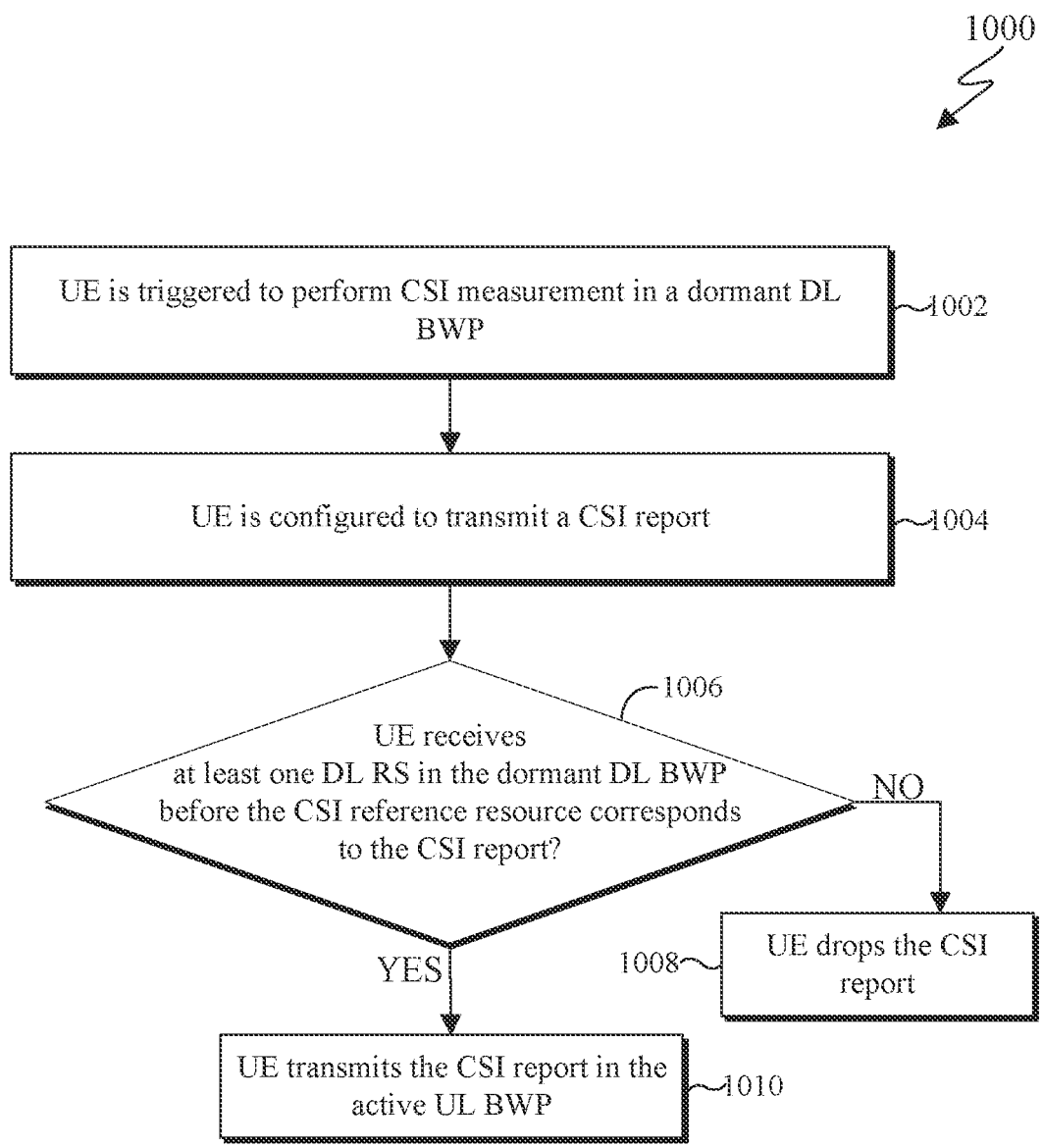
FIG. 10 illustrates an example method of a UE procedure for periodic or semi-persistent CSI reporting according to embodiments of the present disclosure.

FIG. 10 illustrates an example method 1000 of a UE procedure for periodic or semi-persistent CSI reporting according to embodiments of the present disclosure. For example, the steps of the method 700 can be performed by the any of the UEs 111-116 of FIG. 1, such as the UE 116 of FIG. 3. The method 1000 of FIG. 10 is for illustration only and other embodiments can be used without departing from the scope of the present disclosure.

In step 1002, a UE is triggered to perform CSI measurement in a dormant DL BWP. In step 1004, the UE is configured to transmit a periodic or semi-persistent CSI report. In step 1006, the UE determines whether the UE receives at least one DL RS in the dormant DL BWP before the CSI reference resource corresponds to the CSI report. If the UE receives at least one DL RS transmission occasion for CSI measurement during the indicated measurement gap no later than CSI reference resource, the UE in step 1010 transmits the CSI report in the active UL BWP 1004. If the UE does not receive at least one DL RS transmission before the CSI reference resource corresponds to the CSI report, the UE in step 1008, and drops the report.

In certain embodiments, when the CSI measurement in dormant BWP is enabled, the UE reports a CSI report for a DL BWP upon receipt of at least one CSI-RS transmission occasion for channel measurement and CSI-RS and/or CSI-IM occasion for interference measurement during the indicated measurement gap when the DL BWP is dormant BWP or in valid DL slot when the DL BWP is active DL BWP no later than CSI reference resource and drops the report otherwise. When more than one CSI measurement occasion occurs, the UE reports CSI derived from the most recent CSI measurement occasion.

It is also possible that the UE receives a MAC CE to indicate a dormant BWP for CSI-RS resources reception/measurement or one or more CSI reports based on the CSI-RS resource reception/measurement.

Although FIG. 10 illustrates the method 1000, various changes may be made to FIG. 10. For example, while method 1000 of FIG. 10 is shown as a series of steps, various steps could overlap, occur in parallel, occur in a different order, or occur multiple times. In another example, steps may be omitted or replaced by other steps. For example, steps of the method 1000 can be executed in a different order.

Aperiodic CSI Measurement/Report for Multiple BWPs Triggered by a Group Common PDCCH As discussed above, embodiments of this disclosure consider and describe aperiodic CSI measurement or reporting for N>1 DL BWPs triggered by a DCI format monitored in common search space set. The DCI format is referred as DCI format 3.

For determining the aperiodic DL RS for CSI measurement across $N_1>1$ DL BWPs, a UE, such as the UE 116, can be provided with $N_1$ CSI resources configurations. Each resource configuration can be denoted as CSI-ResourceConfig. The configurations can be part of the system information and received by the UE in PDSCH scheduled by DCI format with CRC scrambled by SI-RNTI. The CSI-ResourceConfig can include a CSI-ResourceConfig ID. The CSI-ResourceConfig can include a DL BWP indicator. The DL BWP indicator indicates the DL BWP where the aperiodic CSI-RS resources defined by the CSI-ResourceConfig are transmitted. It is noted that the UE does not expect to receive different CSI-ResourceConfig with same DL BWP indicator. The CSI-ResourceConfig can include $N_2 \geq 1$ CSI-RS resource sets, where each CSI-RS resource set, denoted as csi-RS-ResourceSet defines a list of non-zero power (NZP) CSI-RS resources. The resource type of the NZP CSI-RS resources is predetermined to be aperiodic.

In certain embodiments, a csi-RS-ResourceSet can include an ID. In certain embodiments, a csi-RS-ResourceSet can include a list of NZP CSI-RS resources, where each NZP CSI-RS resource can be determined based on higher layer parameter, NZP-CSI-RS-Resource. In certain embodiments, a csi-RS-ResourceSet can include an aperiodic Triggering Offset, denoted as $X_{offset}$. When the DL BWP to receive the CSI-RS resource set is the first DL BWP for aperiodic CSI measurement triggered by a DCI format 3, $X_{offset}$ indicates the slot offset between the slot containing the DCI that triggers the aperiodic CSI measurement and the first slot in which the CSI-RS resource set is transmitted. Otherwise $X_{offset}$ indicates slot offset between the last slot in which the CSI-RS resource set from the previous DL BWP is transmitted and the slot in which the CSI-RS resource set is transmitted. It is noted that the UE does not expect to be configured with an aperiodic triggering offset smaller than BWP switching delay reported by the UE.

For triggering aperiodic CSI measurement across multiple DL BWPs, a UE, such as the UE 116 of FIG. 1, can be provided with a configuration of DCI format 3, which is monitored in a common search space set. The configuration can include a list of K CSI-ResourceConfig IDs. The DCI format 3 includes K consecutive A-CSI-RS triggering fields, where the kth (k=1, . . . , K). A-CSI-RS triggering field is associated with the CSI-ResourceConfig indicated by the kth CSI-ResourceConfig configuration ID. The value of kth A-CSI-RS triggering field, $v_k$, indicates the $(v_k+1)$th csi-RS-ResourceSet from the CSI-ResourceConfig indicated by the kth CSI-ResourceConfig ID. The value of K is equals to the number of CSI-ResourceConfig, $N_1$. The configuration is provided to UE through higher layer signaling. For example, the configuration can be part of system information, and is received by the UE in PDSCH scheduled by a DCI format with CRC scrambled by SI-RNTI. For another example, the configuration is provided to UE through UE-specific RRC signaling.

Figure 11:
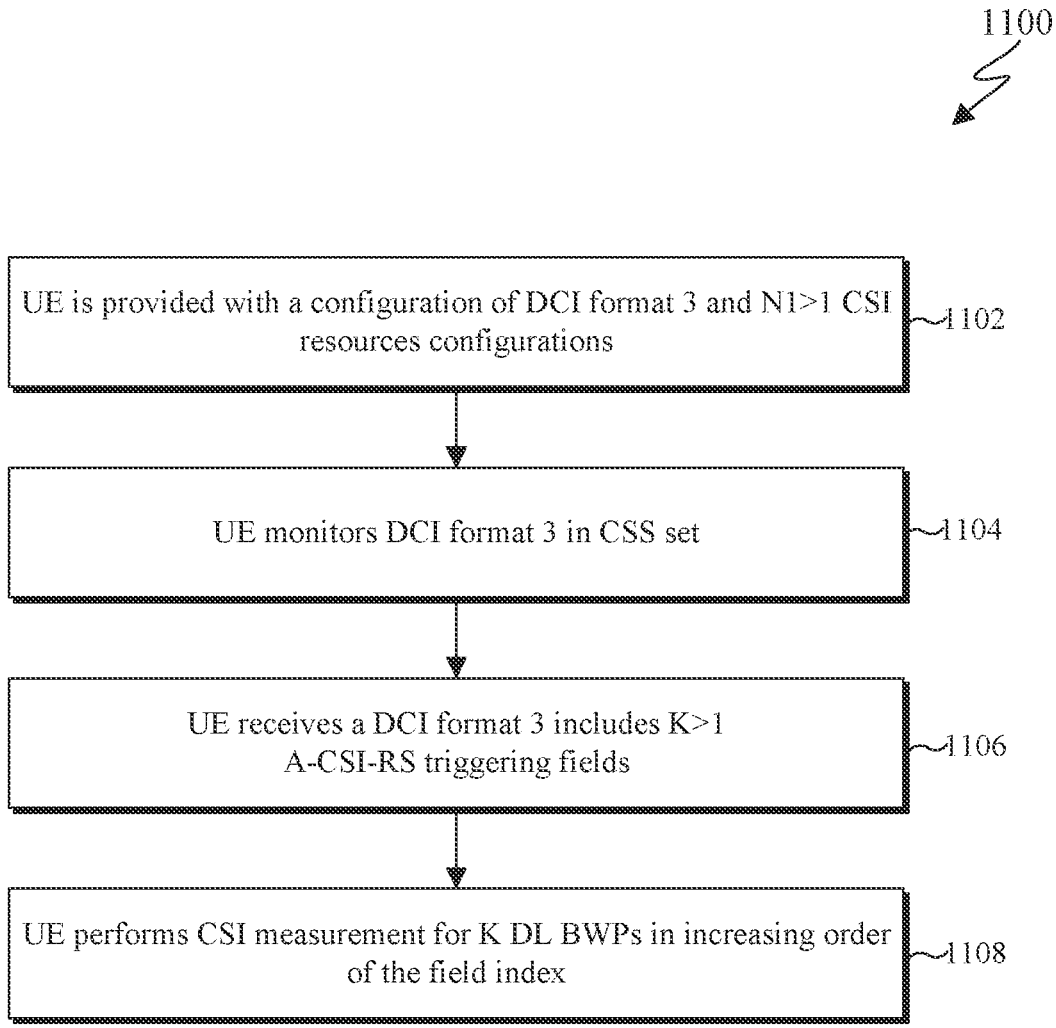
FIG. 11 illustrates an example method of a UE procedure for aperiodic CSI measurement according to embodiments of the present disclosure.

FIG. 11 illustrates an example method 1100 of a UE procedure for aperiodic CSI measurement according to embodiments of the present disclosure. For example, the steps of the method 700 can be performed by the any of the UEs 111-116 of FIG. 1, such as the UE 116 of FIG. 3. The method 1100 of FIG. 11 is for illustration only and other embodiments can be used without departing from the scope of the present disclosure.

As illustrated in FIG. 11, the method 1100 illustrates an example of UE procedure for aperiodic CSI measurement across multiple BWPs triggered by a DCI format. In step 1102, a UE, such as the UE 116 of FIG. 1 is provided with a configuration of DCI format 3, and multiple CSI resources configurations. For example, the number of CSI resources configurations can be more than one. In step 1104, the UE monitors DCI format 3 in a CSS set. In step 1106, the UE receives a DCI format 3 that includes K>1 A-CSI-RS triggering fields. In step 1108, the UE then performs CSI measurement for K>1 DL BWPs in increasing order of the A-CSI-RS triggering field index. The channel measurement for kth DL BWP is based on aperiodic CSI-RS resources indicated by the kth A-CSI-RS triggering field.

In certain embodiments, when a UE, such as the UE 116, is triggered to perform CSI measurement across multiple DL BWPs, the UE does not expect to transmit any UL signal/channel nor receive other DL channel/signal other than the indicated aperiodic CSI-RS resources.

In certain embodiments, when UE, such as the UE 116, completes a CSI measurement across the multiple DL BWPs, the UE can switch to a predetermined DL BWP. For example, the predetermined DL BWP is the default DL BWP preconfigured by higher layers. For another example, the predetermined DL BWP is the DL BWP with best channel quality based on the CSI measurement. In this case, the UE reports the ID of the DL BWP with best channel quality to gNB. For error handling, if the UE does not receive any DL channel/signal after switching to the DL BWP with the best channel quality for a time duration, the UE switches back to a default DL BWP. The time duration can be either predefined in the specification of system operation (such as a time of 5 ms) or provided to the UE through higher layer signaling.

For aperiodic CSI reporting for multiple DL BWPs, a UE, such as the UE 116, can be provided with one or more CSI report configurations for CSI reporting for multiple DL BWPs. A CSI report configuration, denoted as CSI-ReportConfig, can include ID, denoted as reportConfigID. The CSI report configuration can include a ReportSlotOffset, to indicate that the slot offset between the slot containing a DCI that triggers the CSI report and the slot in which the CSI report is transmitted by the UE. The CSI report configuration can include a report quantity denoted as reportQuantity. If the reportQuantity is not configured, the UE can assume a default report quantity, such as cri-RSRP. For example, reportQuantity can be configured to be channel quality indicator (CQI), or a signal-to-noise and interference ratio (SINR), or reference signal received power (RSRP). The CSI report configuration can include a PUCCH-CSI-Resource for indicating a configuration of a PUCCH in which the CSI report is transmitted. The CSI report configuration can include reportFreqConfiguration to define frequency domain configuration for the CSI report. The CSI report configuration can include PUSCH-CSI-Resource that indicates a configuration of a PUSCH in which the CSI report is transmitted. It is noted that the one or more CSI report configurations can be provided to the UE through higher layer signaling, such as UE-specific RRC signaling.

In certain embodiments, to trigger an aperiodic CSI report for multiple DL BWPs, a UE, such as the UE 116, is provided with a configuration of DCI format 3, which is monitored in a common search space set. The DCI format includes N>=1 blocks. The UE can be configured to retrieve information from one block out of the N>=1 blocks. The UE can be provided with a starting position of the one block, and payload size of the DCI format through UE-specific RRC signaling. The one block can include a CSI request indicator. The CSI request indicator indicates one of the preconfigured CSI report configurations. The one block can include a report slot offset, denoted as ReportSlotOffset. The report slot offset, ReportSlotOffset, indicates the slot offset between the slot containing the DCI that triggers the aperiodic CSI report and the slot in which the CSI report is transmitted by the UE. The one block can include a PUCCH-CSI-Resource that indicates a PUCCH in which the CSI report is transmitted. The one block can include a PUSCH-CSI-Resource that indicates a grant of a PUSCH in which the CSI report is transmitted.

In certain embodiments, when a UE receives a DCI format 3 for triggering an aperiodic CSI report for multiple DL BWPs, the UE computes the CSI based on aperiodic CSI-RS resources transmitted in the multiple DL BWPs also indicated by the DCI format 3. In a first approach for determining the content of a CSI report for multiple DL BWPs triggered by DCI format 3, the CSI report includes CSI for each of the multiple DL BWPs. In a second approach for determining the content of a CSI report for multiple DL BWPs triggered by DCI format 3, the CSI report includes CSI for the DL BWP, which has the best channel quality among the multiple DL BWPs. For example, the CSI can be the ID of the DL BWP with best channel quality. For another example, the CSI can be the report quantity of the DL BWP with best channel quality, where the report quantity is defined by reportQuantity, and discussed above.

Although FIG. 11 illustrates the method 1100, various changes may be made to FIG. 7. For example, while method 1100 of FIG. 11 is shown as a series of steps, various steps could overlap, occur in parallel, occur in a different order, or occur multiple times. In another example, steps may be omitted or replaced by other steps. For example, steps of the method 1100 can be executed in a different order.

Figure 12:
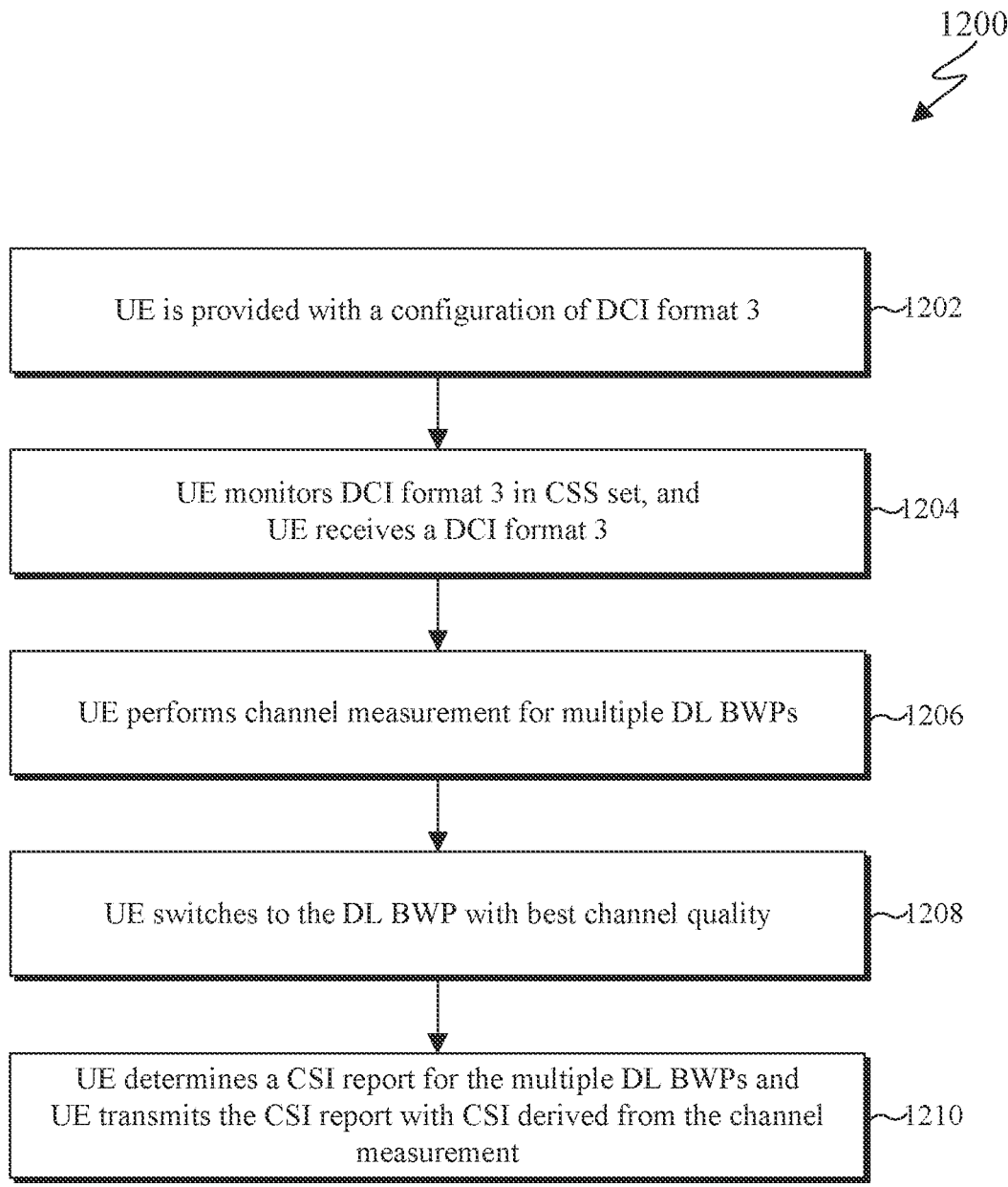
FIG. 12 illustrates an example method of a UE procedure for aperiodic CSI report for multiple DL BWPs according to embodiments of the present disclosure.

FIG. 12 illustrates an example method 1200 of a UE procedure for aperiodic CSI report for multiple DL BWPs according to embodiments of the present disclosure. For example, the steps of the method 700 can be performed by the any of the UEs 111-116 of FIG. 1, such as the UE 116 of FIG. 3. The method 1200 of FIG. 12 is for illustration only and other embodiments can be used without departing from the scope of the present disclosure.

In step 1202, a UE, such as the UE 116, is provided with a configuration of DCI format 3. It is noted that, DCI format 3 includes K>1 consecutive A-CSI-RS triggering fields, where each field indicate a set of aperiodic CSI-RS resources for a DL BWP. Also, the DCI format 3 also includes a block indicates a CSI report.

In step 1204, the UE monitors DCI format 3 in a CSS set. Additionally, in step 1204, the UE receives a DCI format 3 with CRC check succeeded. In step 1206, the UE then perform CSI measurement for K>1 DL BWPs in increasing order of the A-CSI-RS triggering field index. The channel measurement for kth DL BWP can be based on aperiodic CSI-RS resources indicated by the kth A-CSI-RS triggering field.

After completing channel measurement for the last DL BWP, the UE, in step 1208, switches to the DL BWP with the best channel quality. In step 1210, the UE determines a CSI report indicated by the block. The UE then transmits the CSI report with CSI derived from the channel measurement for the K DL BWPs.

In certain embodiments, a UE, such as the UE 116, is provided with timeline requirement of Z1, Z2, or Z3 to ensure sufficient CSI computation time. The UE anticipates the timeline for an aperiodic CSI report and aperiodic CSI measurement for multiple DL BWPs triggered by DCI format 3 to meet the timeline requirement defined by any of Z1, Z2, or Z3.

The timeline requirement of Z1 is the minimum time offset between the last symbol of the PDCCH triggering the aperiodic CSI report/measurement and the first symbol of the aperiodic CSI-RS resource in the first DL BWP in which the UE is indicated to perform CSI measurement. The timeline requirement of Z2 is the minimum time offset between the last symbol of the aperiodic CSI-RS resource from BWP_i, and the first symbol of the aperiodic CSI-RS resource from BWP_j. The UE can receive an indication to perform CSI measurement based on aperiodic CSI-RS resource in BWP_j after completing CSI measurement based on aperiodic CSI-RS resource in BWP_i. The timeline requirement of Z3 is the minimum time offset between the last symbol of the aperiodic CSI-RS resource in the last DL BWP in which the UE is indicated to perform CSI measurement and the first symbol of the PUCCH/PUSCH which carriers the CSI report. It is noted that for determining Z1, Z2, or Z3, the UE can report its capability of any of Z1, Z2, or Z3 to the network. The unit of Z1, Z2, or Z3 can be one slot or one OFDM symbol or one millisecond.

Although FIG. 12 illustrates the method 1200, various changes may be made to FIG. 12. For example, while method 1200 of FIG. 12 is shown as a series of steps, various steps could overlap, occur in parallel, occur in a different order, or occur multiple times. In another example, steps may be omitted or replaced by other steps. For example, steps of the method 1200 can be executed in a different order.

Figure 13:
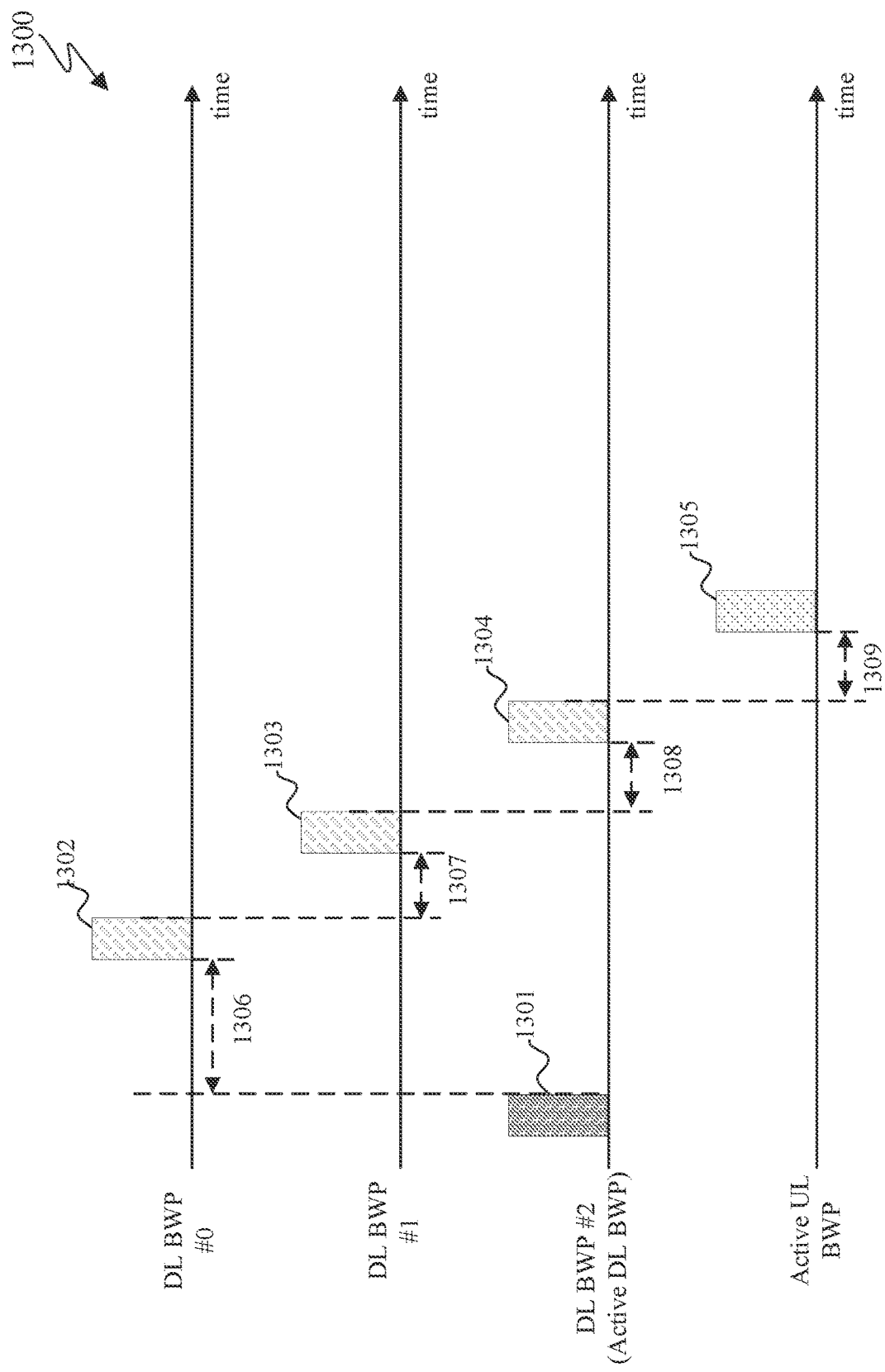
FIG. 13 illustrates an example timeline for aperiodic CSI measurement and report according to embodiments of the present disclosure.

FIG. 13 illustrates an example timeline 1300 for aperiodic CSI measurement and report according to embodiments of the present disclosure. The example timeline 1300 of FIG. 13 is for illustration only and other embodiments can be used without departing from the scope of the present disclosure.

The example timeline 1300 of FIG. 13 illustrates the active DL BWP is DL BWP #2. As illustrated, the example timeline 1300 includes multiple blocks, such as block 1301, 1302, 1303, 1304, and 1305, separated by various time intervals, such as time 1306, 1307, 1308, 1308 and 1309.

The block 1301 is the PDCCH that trigger an aperiodic CSI measurements and report for three DL BWPs. The block 1302 is aperiodic CSI-RS resources in the first DL BWP in which a UE, such as the UE 116, is indicated to perform CSI measurement. The block 1303 is aperiodic CSI-RS resources in the second DL BWP in which the UE is indicated to perform CSI measurement. The block 1304 is aperiodic CSI-RS resources in the last DL BWP in which the UE is indicated to perform CSI measurement. The block 1305 is the PUCCH or PUSCH that carries the aperiodic CSI report.

The time 1306 is the time offset between the last symbol of 1301 and the first symbol of 1302. The time 1307 is the time offset between the last symbol of 1302 and the first symbol of 1303. The time 1308 is the time offset between the last symbol of 1303 and the first symbol of 1304. The time 1309 is the time offset between the last symbol of 804 and the first symbol of 1305.

Accordingly, the example timeline 1300 illustrates that the UE anticipates that the time 1306 is no smaller than Z1. Similarly, the UE anticipates that the time 1307 is no smaller than Z2. The UE also anticipates that the time 1308 is no smaller than Z2. Additionally, the UE anticipates that the time 1309 is no smaller than Z3.

In some embodiments, the UE receives a MAC CE to indicate the CSI-RS resources reception/measurement for one or more DL BWPs or one or more CSI reports based on the CSI-RS resources reception/measurement.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive:
  a first configuration for a first set of downlink (DL) bandwidth parts (BWPs), wherein each DL BWP in the first set of DL BWPs has an index,
  a second configuration for reference signal (RS) resource sets in a second set of DL BWPs that is a subset of the first set of DL BWPs, wherein each element of a RS resource set corresponds to a RS resource,
  a third configuration for channel state information (CSI) reports corresponding to the second set of DL BWPs, and
  on RS resources from the RS resource sets in a third set of DL BWPs that is a subset of the second set of DL BWPs; and
a processor operably connected to the transceiver, the processor configured to determine:
  a first number of CSI reports based on receptions on the RS resources, and
  a second number of CSI reports, from the first number of CSI reports, wherein each CSI report from the second number of CSI reports has a value for a CSI report quantity that is larger than all values for the CSI report quantity in CSI reports that are not from the second number of CSI reports and a corresponding DL BWP index,
wherein the transceiver is further configured to transmit a physical uplink control channel (PUCCH) or a physical uplink shared channel (PUSCH) that includes the second number of CSI reports of the values of the CSI report quantity and information indicating the corresponding DL BWP indexes.

2. The UE of claim 1, wherein the transceiver is further configured to receive a configuration for the second number of CSI reports.

3. The UE of claim 1, wherein the CSI report quantity is one of:
a channel quality indicator (CQI),
a reference signal received power (RSRP), or
a signal-to-interference and noise ratio (SINR).

4. The UE of claim 1, wherein:
the processor is further configured to determine a time duration for reception on the RS resources; and
the transceiver is further configured to:
  skip receptions of physical downlink control channels (PDCCHs) or of physical downlink shared channels (PDSCHs) in the first set of DL BWPs during the time duration, and
  receive PDCCHs or PDSCHs after the time duration, wherein an active DL BWP for the reception of PDCCHs or PDSCHs is the same as an active DL BWP before the time duration.

5. The UE of claim 1, wherein:
the second configuration further includes at least one of the following parameters:
  a periodicity of a measurement gap (MG) denoted as T_MG,
  a time offset of the MG with a value from 0 to T_MG−1, and
  a time duration of the MG;
the processor is further configured to determine the MG based on the one or more included parameters; and
the transceiver is further configured to receive on the RS resources during the MG.

6. The UE of claim 1, wherein:
the transceiver is further configured to receive a physical downlink control channel (PDCCH) that provides a downlink control information (DCI) format, and
the DCI format includes a CSI request field with a value that indicates at least one of:
  the third set of DL BWPs,
  a start time and a time duration for reception on the RS resources,
  the RS resources, and
  scheduling information for the PUSCH or PUCCH transmission.

7. The UE of claim 1, wherein the transceiver is further configured to receive:
a physical downlink shared channel (PDSCH) that provides the second configuration, wherein the PDSCH is scheduled by a first downlink control information (DCI) format with cyclic redundancy check (CRC) bits scrambled by a system information radio network temporary identifier (SI-RNTI); and
a physical downlink control channel (PDCCH) according to a common search space that provides a second DCI format, wherein the second DCI format includes a field with a value that indicates the RS resources.

8. A base station (BS) comprising:
a processor; and
a transceiver operably connected to the processor, the transceiver configured to:
  transmit a first configuration for a first set of downlink (DL) bandwidth parts (BWPs), wherein each DL BWP in the first set of DL BWPs has an index;
  transmit a second configuration for reference signal (RS) resource sets in a second set of DL BWPs that is a subset of the first set of DL BWPs;
  transmit a third configuration for channel state information (CSI) reports corresponding to the second set of DL BWPs;
  transmit using RS resources from the RS resource sets in a third set of DL BWPs that is a subset of the second set of DL BWPs; and
  receive a physical uplink control channel (PUCCH) or a physical uplink shared channel (PUSCH) that includes a number of CSI reports and information indicating corresponding DL BWPs indexes.

9. The base station of claim 8, wherein the transceiver is further configured to transmit a configuration for the number of CSI reports.

10. The base station of claim 8, wherein:
the processor is further configured to determine a time duration for transmission using the RS resources; and
the transceiver is further configured to:
  skip transmission of physical downlink control channels (PDCCHs) or of physical downlink shared channels (PDSCHs) in the first set of DL BWPs during the time duration, and transmit PDCCHs or PDSCHs in an active DL BWP after the time duration, wherein the active DL BWP is the same as an active DL BWP before the time duration.

11. The base station of claim 8, wherein a CSI report quantity included in at least one of the number of CSI reports is one of:
a channel quality indicator (CQI),
a reference signal received power (RSRP), or
a signal-to-interference and noise ratio (SINR).

12. The base station of claim 8, wherein:
the second configuration further includes at least one of the following parameters:
a periodicity of a measurement gap (MG) denoted as T_MG,
a time offset of the MG with a value from 0 to T_MG−1, and
a time duration of the MG;
the processor is further configured to determine the MG based on the one or more included parameters; and
the transceiver is further configured to transmit using the RS resources during the MG.

13. The base station of claim 8, wherein:
the transceiver is further configured to transmit a physical downlink control channel (PDCCH) that provides a downlink control information (DCI) format, and
the DCI format includes a CSI request field with a value that indicates at least one of:
the third set of DL BWPs,
a start time and a time duration for transmission using the RS resources,
the RS resources, and
scheduling information for transmission of the PUSCH or the PUCCH.

14. The base station of claim 8, wherein the transceiver is further configured to transmit:
a physical downlink shared channel (PDSCH) that provides the second configuration, wherein the PDSCH is scheduled by a first downlink control information (DCI) format with cyclic redundancy check (CRC) bits scrambled by a system information radio network temporary identifier (SI-RNTI); and
a physical downlink control channel (PDCCH) according to a common search space that provides a second DCI format, wherein the second DCI format includes a field with a value that indicates the RS resources.

15. A method comprising:
receiving a first configuration for a first set of downlink (DL) bandwidth parts (BWPs), wherein each DL BWP in the first set of DL BWPs has an index;
receiving a second configuration for reference signal (RS) resource sets in a second set of DL BWPs that is a subset of the first set of DL BWPs;
receiving a third configuration for channel state information (CSI) reports corresponding to the second set of DL BWPs, wherein each element of a RS resource set corresponds to a RS resource;
receiving on RS resources from the RS resource sets in a third set of DL BWPs that is a subset of the second set of DL BWPs;
determining a first number of CSI reports based on receptions on the RS resources;
determining a second number of CSI reports, from the first number of CSI reports, wherein each CSI report from the second number of CSI reports has a value for a CSI report quantity that is larger than all values for the CSI report quantity in CSI reports that are not from the second number of CSI reports and a corresponding DL BWP index; and
transmitting a physical uplink control channel (PUCCH) or a physical uplink shared channel (PUSCH) that includes the second number of CSI reports of the values for the CSI report quantity and information indicating the corresponding DL BWP indexes.

16. The method of claim 15, further comprising:
receiving a configuration for the second number of CSI reports; and
determining the CSI report quantity is one of:
a channel quality indicator (CQI),
a reference signal received power (RSRP), or
a signal-to-interference and noise ratio (SINR).

17. The method of claim 15, further comprising:
determining a time duration for reception on the RS resources;
skipping receptions of physical downlink control channel (PDCCHs) or of physical downlink shared channels (PDSCHs) in the first set of DL BWPs during the time duration; and
receiving PDCCHs or PDSCHs after the time duration, wherein an active DL BWP for the reception of PDCCHs or PDSCHs is the same as an active DL BWP before the time duration.

18. The method of claim 15, further comprising:
determining the second configuration to further include at least one of the following parameters:
a periodicity of a measurement gap (MG) denoted as T_MG,
a time offset of the MG with a value from 0 to T_MG−1, and
a time duration of the MG; and
determining the MG based on the one or more included parameters
wherein receiving on the RS resources further comprises receiving on the RS resources during the MG.

19. The method of claim 15, further comprising:
receiving a physical downlink control channel (PDCCH) that provides a downlink control information (DCI) format,
wherein the DCI format includes a CSI request field with a value that indicates at least one of:
the third set of DL BWPs,
a start time and a time duration for reception on the RS resources,
the RS resources, and
scheduling information for the PUSCH or PUCCH transmission.

20. The method of claim 15, further comprising:
receiving a physical downlink shared channel (PDSCH) that provides the second configuration, wherein the PDSCH is scheduled by a first downlink control information (DCI) format with cyclic redundancy check (CRC) bits scrambled by a system information radio network temporary identifier (SI-RNTI); and
receiving a physical downlink control channel (PDCCH) according to a common search space that provides a second DCI format, wherein the second DCI format includes a field with a value that indicates the RS resources.

* * * * *